US012051856B2

(12) United States Patent
Patel et al.

(10) Patent No.: US 12,051,856 B2
(45) Date of Patent: Jul. 30, 2024

(54) RECONFIGURABLE MULTI-BAND BASE STATION ANTENNAS HAVING SELF-CONTAINED SUB-MODULES

(71) Applicant: CommScope Technologies LLC, Hickory, NC (US)

(72) Inventors: Sammit Patel, Dallas, TX (US); Amit Kaistha, Coppell, TX (US); Gangyi Deng, Allen, TX (US); XiaoHua Hou, Richardson, TX (US); Chengcheng Tang, Murphy, TX (US); Joy Huang, Plano, TX (US)

(73) Assignee: CommScope Technologies LLC, Claremont, NC (US)

( * ) Notice: Subject to any disclaimer, the term of this patent is extended or adjusted under 35 U.S.C. 154(b) by 650 days.

(21) Appl. No.: 17/280,960

(22) PCT Filed: Oct. 4, 2019

(86) PCT No.: PCT/US2019/054661

§ 371 (c)(1),
(2) Date: Mar. 29, 2021

(87) PCT Pub. No.: WO2020/072880

PCT Pub. Date: Apr. 9, 2020

(65) Prior Publication Data

US 2021/0384616 A1 Dec. 9, 2021

Related U.S. Application Data

(60) Provisional application No. 62/779,468, filed on Dec. 13, 2018, provisional application No. 62/741,568, filed on Oct. 5, 2018.

(51) Int. Cl.

*H04W 16/28* (2009.01)
*H01Q 1/24* (2006.01)

(Continued)

(52) U.S. Cl.

CPC ........... *H01Q 21/065* (2013.01); *H01Q 1/246* (2013.01); *H01Q 1/42* (2013.01); *H01Q 5/42* (2015.01);

(Continued)

(58) Field of Classification Search

CPC ........ H01Q 21/065; H01Q 5/42; H01Q 1/246; H01Q 1/42; H01Q 19/108; H01Q 21/0025;

(Continued)

(56) References Cited

U.S. PATENT DOCUMENTS 8,743,008 B2 6/2014 Kim et al.
9,888,391 B2 2/2018 Ho et al.

(Continued)

FOREIGN PATENT DOCUMENTS

CN 1886864 A 12/2006
CN 201233948 Y 5/2009

(Continued)

OTHER PUBLICATIONS

Extended European Search Report corresponding to European Patent Application No. 19869997.7 (11 pages) (dated Jun. 7, 2022).

(Continued)

*Primary Examiner* — Moustapha Diaby
(74) *Attorney, Agent, or Firm* — Myers Bigel, P.A.

(57) ABSTRACT

Base station antennas include a main module that has a first backplane that includes a first reflector. A vertically-extending array of first radiating elements is mounted to extend forwardly from the first reflector, and at least one first RF port is coupled to the vertically-extending array of first radiating elements. These antennas further include a sub-module that is attached to the first backplane. The sub-module includes a second backplane that has a second reflector that is separate from the first reflector. A vertically- (Continued)

extending array of second radiating elements is mounted to extend forwardly from the second reflector and is transversely spaced-apart from the vertically-extending array of first radiating elements. A plurality of second RF ports are coupled to the vertically-extending array of second radiating elements. The vertically-extending array of first radiating elements and the vertically-extending array of second radiating elements are configured to serve a common sector of a base station.

27 Claims, 27 Drawing Sheets

(51) Int. Cl.

| | |
|---|---|
| ***H01Q 1/42*** | (2006.01) |
| ***H01Q 5/42*** | (2015.01) |
| ***H01Q 19/10*** | (2006.01) |
| ***H01Q 21/00*** | (2006.01) |
| ***H01Q 21/06*** | (2006.01) |
| ***H01Q 21/28*** | (2006.01) |
| ***H01Q 25/00*** | (2006.01) |
| ***H04B 7/0408*** | (2017.01) |
| ***H04W 16/24*** | (2009.01) |

(52) U.S. Cl.
CPC ....... *H01Q 19/108* (2013.01); *H01Q 21/0025* (2013.01); *H01Q 21/0037* (2013.01); *H01Q 21/28* (2013.01); *H01Q 25/001* (2013.01)

(58) Field of Classification Search
CPC ... H01Q 21/0037; H01Q 21/28; H01Q 25/001
See application file for complete search history.

(56) References Cited

U.S. PATENT DOCUMENTS

| | | | | |
|---|---|---|---|---|
| 2005/0206575 | A1 | 9/2005 | Chadwick et al. | |
| 2011/0237299 | A1 | 9/2011 | Boss et al. | |
| 2012/0280874 | A1* | 11/2012 | Kim | H01Q 3/06 343/763 |
| 2014/0111396 | A1* | 4/2014 | Hyjazie | H01Q 21/26 343/893 |
| 2014/0313095 | A1* | 10/2014 | Pu | H01Q 1/246 343/836 |
| 2015/0263424 | A1 | 9/2015 | Sanford et al. | |
| 2016/0066476 | A1 | 3/2016 | Gu et al. | |
| 2016/0099745 | A1 | 4/2016 | Ho et al. | |
| 2016/0119796 | A1 | 4/2016 | Ho et al. | |
| 2016/0153609 | A1* | 6/2016 | Ortel | A47B 81/06 211/26 |
| 2016/0240916 | A1 | 8/2016 | Rucki et al. | |
| 2016/0302078 | A1* | 10/2016 | Sivanandar | H01Q 1/246 |
| 2016/0365618 | A1* | 12/2016 | Kim | H01Q 1/1242 |
| 2016/0365624 | A1* | 12/2016 | Maley | H01Q 21/205 |
| 2017/0149115 | A1 | 5/2017 | Sierzenga et al. | |
| 2017/0215192 | A1 | 7/2017 | Lipowski et al. | |
| 2017/0365921 | A1* | 12/2017 | Webb | H04B 1/40 |
| 2018/0026379 | A1* | 1/2018 | Barker | H01Q 21/28 343/844 |
| 2018/0316092 | A1* | 11/2018 | Cai | H01P 5/185 |
| 2019/0390797 | A1 | 12/2019 | Bell et al. | |
| 2021/0218156 | A1 | 7/2021 | Patel et al. | |

FOREIGN PATENT DOCUMENTS

| | | | |
|---|---|---|---|
| CN | 102522634 | A | 6/2012 |
| CN | 103490175 | A | 1/2014 |
| CN | 208782034 | U | 4/2019 |
| EP | 0994524 | A1 | 4/2000 |
| EP | 3217475 | A1 | 9/2017 |
| JP | 2015050669 | A | 3/2015 |
| WO | 2013191800 | A1 | 12/2013 |
| WO | 2016036951 | A1 | 3/2016 |
| WO | 2016095960 | A1 | 6/2016 |
| WO | 2018140305 | A1 | 8/2018 |

OTHER PUBLICATIONS

International Search Report and the Written Opinion of the International Searching Authority corresponding to International Patent Application No. PCT/US2019/054661 (14 pages) (mailed Feb. 14, 2020).

* cited by examiner

RECONFIGURABLE MULTI-BAND BASE STATION ANTENNAS HAVING SELF-CONTAINED SUB-MODULES

CROSS-REFERENCE TO RELATED APPLICATION

The present application is a 35 USC § 371 US national stage application of PCT/US2019/054661, filed Oct. 4, 2019, which claims priority under 35 U.S.C. § 119 to U.S. Provisional Patent Application Ser. No. 62/779,468, filed Dec. 13, 2018, and to U.S. Provisional Patent Application Ser. No. 62/741,568, filed Oct. 5, 2018, the entire content of each of which is incorporated herein by reference as if set forth in its entirety.

BACKGROUND

The present invention generally relates to radio communications and, more particularly, to base station antennas for cellular communications systems.

Cellular communications systems are well known in the art. In a cellular communications system, a geographic area is divided into a series of regions that are referred to as "cells" which are served by respective base stations. The base station may include one or more antennas that are configured to provide two-way radio frequency ("RF") communications with mobile subscribers that are within the cell served by the base station. In many cases, each cell is divided into "sectors." In one common configuration, a hexagonally shaped cell is divided into three 120° sectors in the azimuth plane, and each sector is served by one or more base station antennas that have an azimuth Half Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

In order to accommodate the increasing volume of cellular communications, cellular operators have added cellular service in a variety of new frequency bands. While in some cases it is possible to use a single linear array of so-called "wide-band" radiating elements to provide service in multiple frequency bands, in other cases it is necessary to use different linear arrays (or planar arrays) of radiating elements to support service in the different frequency bands.

As the number of frequency bands has proliferated, and increased sectorization has become more common (e.g., dividing a cell into six, nine or even twelve sectors), the number of base station antennas deployed at a typical base station has increased significantly. However, due to, for example, local zoning ordinances and/or weight and wind loading constraints for the antenna towers, there is often a limit as to the number of base station antennas that can be deployed at a given base station. In order to increase capacity without further increasing the number of base station antennas, multi-band base station antennas have been introduced which include multiple linear arrays of radiating elements. One common multi-band base station antenna design includes two linear arrays of "low-band" radiating elements that are used to provide service in some or all of the 617-960 MHz frequency band and two linear arrays of "mid-band" radiating elements that are used to provide service in some or all of the 1427-2690 MHz frequency band. The four linear arrays are mounted in side-by-side fashion. There is also interest in deploying base station antennas that include one or more linear arrays of "high-band" radiating elements that operate in higher frequency bands, such as some or all of the 3.3-4.2 GHz frequency band. As larger numbers of linear arrays are included in base station antennas, it becomes more difficult, time-consuming and expensive to design, fabricate and test these antennas.

SUMMARY

Pursuant to embodiments of the present invention, base station antennas are provided that include a first backplane that includes a first reflector, a vertically-extending array of first radiating elements mounted to extend forwardly from the first reflector, at least one first RF port that is coupled to the vertically-extending array of first radiating elements, and a sub-module that is attached to the first backplane. The sub-module includes a second backplane that includes a second reflector that is separate from the first reflector, a vertically-extending array of second radiating elements that is transversely spaced-apart from the vertically-extending array of first radiating elements, the second radiating elements mounted to extend forwardly from the second reflector, and a plurality of second RF ports that are coupled to the vertically-extending array of second radiating elements. The first radiating elements and the second radiating elements are configured to serve a common sector of a base station that includes the base station antenna.

In some embodiments, the sub-module may be configured to slidably mate with the first backplane prior to being attached thereto.

In some embodiments, at least one guide may extend forwardly from the first reflector and the second reflector includes a rail that is configured to slidably mate with the at least one guide.

In some embodiments, the second backplane includes a first transversely-extending projection that is configured to slide along a rear surface of the first reflector when the sub-module is slidably mated with the first backplane and a second transversely-extending projection that is configured to slide along a front surface of the first reflector when the sub-module is slidably mated with the first backplane. In such embodiments, a first insulating spacer may be interposed between first transversely-extending projection and the first reflector and a second insulating spacer may be interposed between second transversely-extending projection and the first reflector.

In some embodiments, a stop feature may extend forwardly from the first reflector.

In some embodiments, the second reflector; may be positioned forwardly of the first reflector.

In some embodiments, the second reflector may be coplanar with the first reflector.

In some embodiments, the sub-module may further include a phase shifter coupled between the second RF ports and the vertically-extending array of second radiating elements. The phase shifter may be mounted on a rear side of the second backplane.

In some embodiments, the vertically-extending array of second radiating elements may be one of a plurality of vertically-extending linear arrays of second radiating elements included in the sub-module, and the sub-module may further include a calibration circuit that is coupled between the second RF ports and the vertically-extending array of second radiating elements.

In some embodiments, the sub-module may further include a phase shifter coupled between the second RF ports and the vertically-extending array of second radiating elements.

In some embodiments, the base station antenna may further include a first end plate that extends both forwardly and rearwardly along a lower edge of the first reflector, and an end cap that covers the first end plate. In some embodiments, the sub-module may include a second end plate that extends both forwardly and rearwardly along a lower edge of the second reflector. In some embodiments, the first end plate includes an opening, and the second end plate is received within the opening In some embodiments, the base station antenna may further include a vertically-extending array of third radiating elements mounted to extend forwardly from the first reflector, and the vertically-extending array of second radiating elements may be positioned between the vertically-extending array of first radiating elements and the vertically-extending array of third radiating elements.

In some embodiments, the periphery of the first reflector may define a footprint when viewed along an axis that is perpendicular to the first reflector, and at least some of the second radiating elements may be within the footprint.

In some embodiments, the sub-module may be attached to the first backplane via a plurality of fasteners.

Pursuant to further embodiments of the present invention, base station antennas are provided that include a first backplane that includes a first reflector, a vertically-extending array of first radiating elements mounted to extend forwardly from the first reflector, a sub-module that includes a second reflector, the sub-module slidably mated with the first backplane, and a vertically-extending array of second radiating elements mounted to extend forwardly from the second reflector.

In some embodiments, the vertically-extending array of second radiating elements may be transversely spaced-apart from the vertically-extending array of first radiating elements.

In some embodiments, the second reflector may extend in parallel to the first reflector.

In some embodiments, the second reflector may be coplanar with the first reflector.

In some embodiments, the sub-module may further include a sub-module end plate that is mounted at the bottom of the second reflector, and a plurality of RF ports that are mounted in the sub-module end plate.

In some embodiments, at least one guide may extend forwardly from the first reflector and the second reflector may include a rail that is configured to slidably mate with the at least one guide.

In some embodiments, the second reflector may be part of a second backplane, and the second backplane may include a first transversely-extending projection that is configured to slide along a rear surface of the first reflector when the sub-module is slidably mated with the first backplane and a second transversely-extending projection that is configured to slide along a front surface of the first reflector when the sub-module is slidably mated with the first backplane.

In some embodiments, a first insulating spacer may be interposed between first transversely-extending projection and the first reflector and a second insulating spacer may be interposed between second transversely-extending projection and the first reflector.

In some embodiments, the second reflector may be part of a second backplane and the sub-module may further include a phase shifter coupled between a first of the second RF ports and the vertically-extending array of second radiating elements, where the phase shifter is mounted on a rear side of the second backplane.

In some embodiments, the sub-module may further include a plurality of RF ports, and the vertically-extending array of second radiating elements is one of a plurality of vertically-extending linear arrays of second radiating elements included in the sub-module, and the sub-module further includes a calibration circuit that is coupled between the RF ports and the vertically-extending array of second radiating elements.

In some embodiments, the base station antenna may further include a main end plate that extends both forwardly and rearwardly along a lower edge of the first reflector, and an end cap that covers the main end plate.

In some embodiments, the sub-module may further include a sub-module end plate that is mounted at the bottom of the second reflector, and a plurality of RF ports that are mounted in the sub-module end plate, and the main end plate may include an opening, and the sub-module end plate may be received within the opening.

In some embodiments, the periphery of the first reflector defines a footprint when viewed along an axis that is perpendicular to the first reflector, and at least some of the second radiating elements are within the footprint.

In some embodiments, the second reflector may be positioned forwardly of the first reflector.

Pursuant to still further embodiments of the present invention, base station antennas are provided that include a first backplane that includes a first reflector, a vertically-extending array of first radiating elements mounted to extend forwardly from the first reflector, and a sub-module that is attached by a plurality of fasteners to the first backplane. The sub-module includes a second reflector that is mounted forwardly of the first reflector, a vertically-extending array of second radiating elements that is transversely spaced-apart from the vertically-extending array of first radiating elements, the second radiating elements mounted to extend forwardly from the second reflector, and a plurality of RF ports that are coupled to the vertically-extending array of second radiating elements.

In some embodiments, the second reflector may be coplanar with the first reflector.

In some embodiments, the sub-module may be configured to slidably mate with the first backplane prior to being attached thereto.

In some embodiments, at least one guide may extend forwardly from the first reflector and the second reflector may include a rail that is configured to slidably mate with the at least one guide.

In some embodiments, the second reflector may be part of a second backplane that includes a first transversely-extending projection that is configured to slide along a rear surface of the first reflector when the sub-module is slidably mated with the first backplane and a second transversely-extending projection that is configured to slide along a front surface of the first reflector when the sub-module is slidably mated with the first backplane.

In some embodiments, the periphery of the first reflector may define a footprint when viewed along an axis that is perpendicular to the first reflector, and at least some of the second radiating elements may be within the footprint.

In some embodiments, the sub-module may further include a phase shifter coupled between the RF ports and the vertically-extending array of second radiating elements.

In some embodiments, the vertically-extending array of second radiating elements may be one of a plurality of vertically-extending linear arrays of second radiating elements included in the sub-module, and the sub-module may further include a calibration circuit that is coupled between the RF ports and the vertically-extending array of second radiating elements.

In some embodiments, the vertically-extending array of second radiating elements may comprise four vertically-extending linear arrays of radiating elements that are configured as a beamforming array.

Pursuant to still further embodiments of the present invention, base station antenna assemblies are provided that include a base station antenna having a frame, a radome that covers the frame, and a bottom end cap, and a radio mounted to the frame on a rear side of the base station antenna. The bottom end cap includes a plurality of upwardly extending connector ports.

In some embodiments, the bottom end cap includes a rearwardly-extending lip that extends further rearwardly than the radome, and the connector ports are mounted to extend upwardly from a top surface of the rearwardly-extending lip.

In some embodiments, the radio may be a beamforming radio that includes a plurality of downwardly-extending radio connector ports that face the connector ports that extend upwardly from a top surface of the rearwardly extending lip.

Pursuant to still further embodiments of the present invention, base station antenna assemblies are provided that include a base station antenna having a frame and a radome that covers the frame, and first and second radios mounted on the frame on a rear side of the base station antenna, with the second radio mounted above the first radio. A rear surface of the radome includes a first opening, and a plurality of connector ports extend through the first opening.

In some embodiments, a panel may be mounted in the first opening, and the plurality of connector ports may be mounted in the panel.

In some embodiments, the first opening may be located above the first radio and below the second radio.

In some embodiments, the base station antenna assembly may further include a second opening that is located below the first radio.

In some embodiments, the base station antenna assembly may further include a second opening that is located above the second radio.

In some embodiments, the base station antenna assembly may further include a second opening that is located above the first opening and below the second radio.

In some embodiments, the base station antenna assembly may further include a cover that covers both the plurality of connector ports and a plurality of radio connector ports on the first radio.

In some embodiments, the cover may include a plurality of heat vents.

In some embodiments, the base station antenna assembly may further include a baffle that that is positioned between the first radio and the second radio. The baffle may be configured to direct heat generated by the first radio away from the second radio.

In some embodiments, the first radio may be mounted on a plate, and the plate may be attached to the base station antenna by at least one guide rail that cooperates with one or more guide structures.

In some embodiments, the guide rail may include a slot.

In some embodiments, the slot may have a generally C-shaped cross-section.

In some embodiments, the one or more guide structures may comprise a plurality of wheels that are mounted on respective posts.

In some embodiments, the one or more guide structures may comprise a rod.

In some embodiments, the guide rail may be mounted on the base station antenna and the one or more guide structures may be mounted on the plate opposite the first radio.

Pursuant to still further embodiments of the present invention, base station antenna assemblies are provided that include a base station antenna having a frame and a radome that covers the frame, and a first radio mounted on a radio support plate that is attached to the frame on a rear side of the base station antenna. A first guide rail is mounted on one of the base station antenna and the plate and one or more cooperating guide structures are mounted on the other of the base station antenna and the radio support plate, where the guide rail and the one or more cooperating guide structures are configured so that when the one or more cooperating guide structures are received within a slot in the guide rail the radio support plate is mounted on the base station antenna.

In some embodiments, the slot may have a generally C-shaped cross-section.

In some embodiments, the one or more guide structures may comprise a plurality of wheels that are mounted on respective posts.

In some embodiments, the one or more guide structures may comprise a rod.

In some embodiments, the guide rail may be mounted on the base station antenna and the one or more guide structures may be mounted on the radio support plate opposite the first radio.

In some embodiments, the base station antenna assembly may further include a jumper cable assembly that includes a plurality of connectorized jumper cables, and a first connector of each jumper cable may be a blind mate connector.

In some embodiments, the first connector of each jumper cable may be mounted in respective openings in a mounting plate, and the openings may be arranged in a pattern identical to a pattern of the radio connector ports on the first radio.

In some embodiments, a second connector of each jumper cable may comprise a blind mate connector.

Pursuant to still further embodiments of the present invention, base station antenna assemblies are provided that include a base station antenna having a frame, a radome that covers the frame, and a bottom end cap, a first radio mounted to the frame on a rear side of the base station antenna, and a second radio mounted to the frame on a rear side of the base station antenna above the first radio. A rear surface of the radome includes a first opening, and a panel having a plurality of access holes is mounted in the first opening, and a plurality of connectorized cables extend from the interior of the base station antenna through respective ones of the access holes.

DETAILED DESCRIPTION

Figure 1:
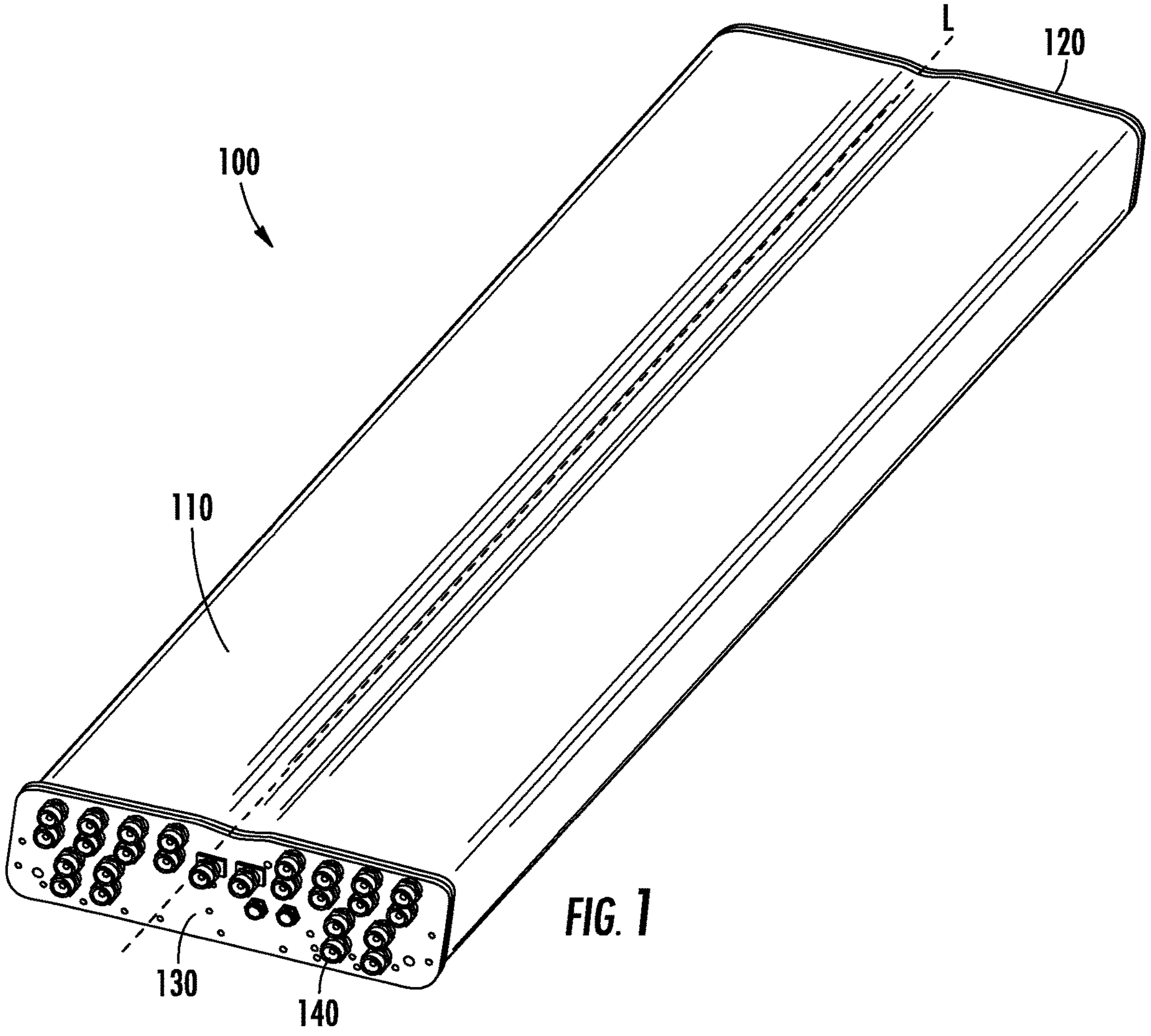
FIG. 1 is a perspective view of a base station antenna according to embodiments of the present invention.

Pursuant to embodiments of the present invention, reconfigurable multi-band antennas are provided that include one or more self-contained sub-modules. These antennas may include a main module and at least one self-contained sub-module that may be attached to the main module. The main module includes at least a first array of radiating elements and the sub-module includes at least a second array of radiating elements. The sub-module may be completely self contained in that the RF paths between the one or more arrays of radiating elements included in the sub-module and the one or more RF ports that connect those arrays of radiating elements to a radio are contained within the sub-module. Thus, the sub-module may include, for example, the RF ports associated with the sub-module arrays, the RF transmission paths that extend between the RF ports and the radiating elements, and any phase shifters, power splitter/combiners, diplexers and the like that are included along the RF paths. If the sub-module includes arrays of radiating elements that are used to perform beamforming, then the sub-module may further include a calibration port along with appropriate calibration circuitry. The sub-module may optionally include other elements, such as, for example, RET actuators and/or mechanical linkages for any phase shifters included in the sub-module, although these components may alternatively be included in the main module and connected to the sub-module or omitted altogether. Each sub-module may have its own backplane and reflector that may be configured to optimize the performance of the sub-module.

In some embodiments, the sub-module may slidably mate with the main module. In other embodiments, the sub-module may simply be placed in or on the main module and fixed in place.

The antennas according to embodiments of the present invention that include self-contained sub-modules may have a number of advantages as compared to conventional antennas. First, since the sub-modules contain the complete RF path between the RF ports and the radiating elements, each sub-module may be fabricated and tested independently of any other sub-modules and the main module of an antenna. This allows various parts of the antenna to be fabricated and tested in parallel, which may reduce manufacturing time. Additionally, if some aspect of the sub-module needs to be redesigned, adjusted or replaced, then this work may be performed without any need to change the main module of the antenna. The sub-module approach also makes it easy to change various aspects of the sub-module, such as the distance of the sub-module reflector from the radome without impacting the remainder of the antenna design. The sub-module approach also makes the antenna reconfigurable, as a first sub-module may be taken out of the antenna and replaced with a different sub-module (e.g., a sub-module with a different configuration of arrays operating in different frequency bands) in order to change the capabilities of the antenna. The sub-module approach may be particularly advantageous with antennas that include beamforming capabilities, as the testing and calibration of the beamforming capabilities may be performed before the sub-module is mated with the remainder of the antenna.

In some embodiments, the base station antennas include a main module that has a first backplane that includes a first reflector. A vertically-extending array of first radiating elements is mounted to extend forwardly from the first reflector, and at least one first RF port is coupled to the vertically-extending array of first radiating elements. These antennas further include a sub-module that is attached to the first backplane. The sub-module includes a second backplane that has a second reflector that is separate from the first reflector. A vertically-extending array of second radiating elements is mounted to extend forwardly from the second reflector and is transversely spaced-apart from the vertically-extending array of first radiating elements. A plurality of second RF ports are coupled to the vertically-extending array of second radiating elements. The vertically-extending array of first radiating elements and the vertically-extending array of second radiating elements are configured to serve a common sector of a base station. For example, both arrays may be configured to provide coverage to a common 120° sector in the azimuth plane.

In other embodiments, the base station antennas include a first backplane that includes a first reflector. A vertically-extending array of first radiating elements may be mounted to extend forwardly from the first reflector. These antennas further include a sub-module that has a second reflector. The sub-module is slidably mated with the first backplane. A vertically-extending array of second radiating elements is mounted to extend forwardly from the second reflector.

In yet other embodiments, the base station antennas include a first backplane that includes a first reflector and a vertically-extending array of first radiating elements are mounted to extend forwardly from the first reflector. These antennas further include a sub-module that is attached by a plurality of fasteners to the first backplane. The sub-module includes a second reflector that is mounted forwardly of the first reflector so that the second reflector is closer to a front surface of the radome than is the first reflector. The sub-module further includes a vertically-extending array of second radiating elements that is mounted to extend forwardly from the second reflector and a plurality of second RF ports that are coupled to the vertically-extending array of second radiating elements so that the sub-module is a self-contained sub-module that includes the complete RF path for the vertically-extending array of second radiating elements. The vertically-extending arrays of first and second radiating elements may be is transversely spaced-apart from one another.

Embodiments of the present invention will now be described in further detail with reference to the attached figures.

FIGS. 1-12 illustrate a base station antenna 100 according to certain embodiments of the present invention. In the description that follows, the antenna 100 will be described using terms that assume that the antenna 100 is mounted for use on a tower with the longitudinal axis L of the antenna 100 extending along a vertical axis and the front surface of the antenna 100 mounted opposite the tower pointing toward the coverage area for the antenna 100.

Figure 2:
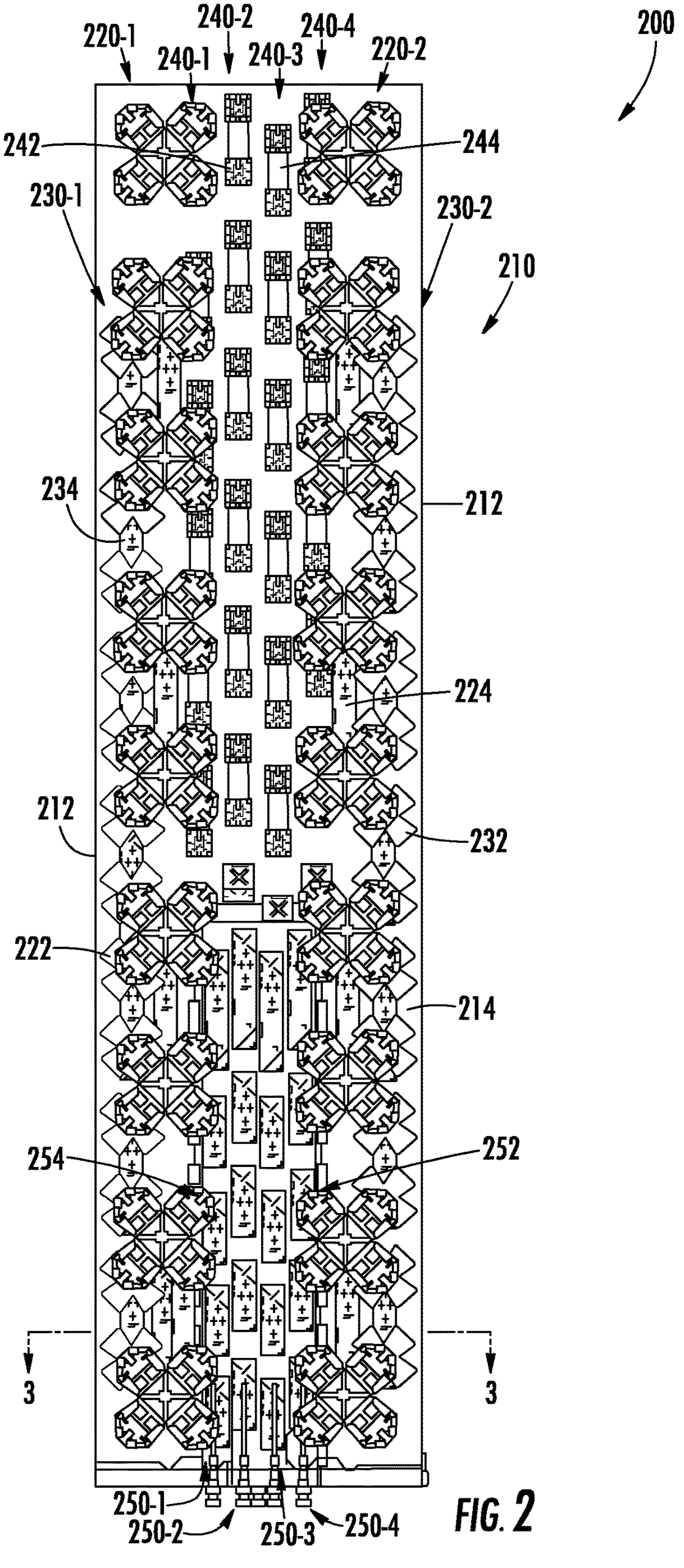
FIG. 2 is a front view of an antenna assembly of the base station antenna of FIG. 1.

Referring first to FIG. 1, the base station antenna 100 is an elongated structure that extends along a longitudinal axis L. The base station antenna 100 may have a tubular shape with generally rectangular cross-section. The antenna 100 includes a radome 110 and a top end cap 120. The radome 110 and the top end cap 120 may comprise a single integral unit, which may be helpful for waterproofing the antenna 100. One or more mounting brackets (not shown) may be provided on the rear side of the antenna 100 which may be used to mount the antenna 100 onto an antenna mount (not shown) on, for example, an antenna tower. The antenna 100 also includes a bottom end cap 130 which includes a plurality of connectors 140 mounted therein. The antenna 100 is typically mounted in a vertical configuration (i.e., the longitudinal axis L may be generally perpendicular to a plane defined by the horizon) when the antenna 100 is mounted for normal operation. The radome 110, top cap 120 and bottom cap 130 may form an external housing for the antenna 100. An antenna assembly 200 is contained within the housing (FIG. 2). The antenna assembly 200 may be slidably inserted into the radome 110, typically from the bottom before the bottom cap 130 is attached to the radome 110.

Figure 3:
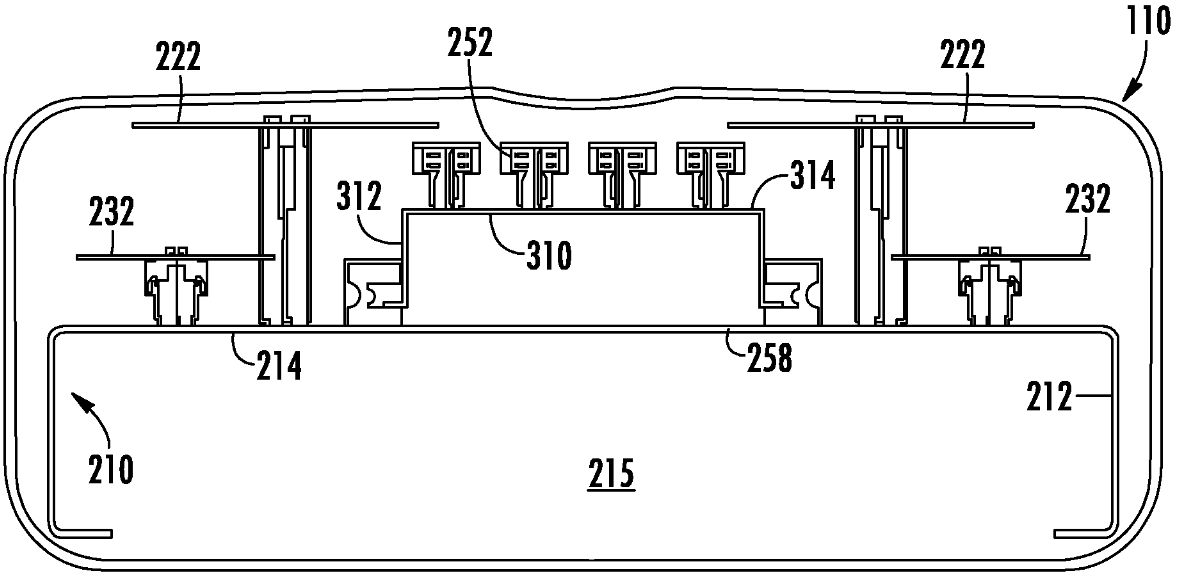
FIG. 3 is a schematic cross-sectional view of the antenna assembly of FIG. 2 with the elements mounted behind the main backplane and the sub-module backplane omitted.

FIGS. 2 and 3 are a front view and a cross-sectional view, respectively, of the antenna assembly 200 of base station antenna 100. The cross-sectional view of FIG. 3 is taken along line 3-3 of FIG. 2. As shown in FIGS. 2-3, the antenna assembly 200 includes a main backplane 210 that has sidewalls 212 and a main reflector 214. The backplane 210 may serve as both a structural component for the antenna assembly 200 and as a ground plane and reflector for the radiating elements mounted thereon. The backplane 210 may also include brackets or other support structures (not shown) that extend between the sidewalls 212 along the rear of the backplane 210. In FIG. 3, various mechanical and electronic components of the antenna 100 that are mounted in the chamber 215 defined between the sidewalls 212 and the back side of the main reflector 214, such as phase shifters, remote electronic tilt units, mechanical linkages, controllers, diplexers, and the like, are omitted to simplify the drawing, and the cross-section of the radome 110 is included in FIG. 3 to provide context.

The main backplane 210 defines a main module of the antenna assembly 200. One or more self-contained sub-modules 300 (FIGS. 4-12) may be mounted on and affixed to the main module. The antenna 100 depicted in FIGS. 1-12 includes one such self-contained sub-module 300.

The main reflector 214 may comprise a generally flat metallic surface that extends in the longitudinal direction L of the antenna 100. Some of the radiating elements (discussed below) of the antenna 100 may be mounted to extend forwardly from the main reflector 214, and the dipole radiators of these radiating elements may be mounted approximately ¼ of a wavelength of the operating frequency for each radiating element forwardly of the main reflector 214. The main reflector 214 may serve as a reflector and as a ground plane for the radiating elements of the antenna 100 that are mounted thereon.

As shown in FIGS. 2-3, the antenna 100 includes a plurality of dual-polarized radiating elements 222, 232, 242, 252. The radiating elements include low-band radiating elements 222, first mid-band radiating elements 232, second mid-band radiating elements 242 and high-band radiating elements 252. The low-band radiating elements 222 are mounted to extend upwardly from the main reflector 214 and are mounted in two columns to form two linear arrays 220-1, 220-2 of low-band radiating elements 222. Each low-band linear array 220 may extend along substantially the full length of the antenna 100 in some embodiments. The low-band radiating elements 222 may be configured to transmit and receive signals in a first frequency band. In some embodiments, the first frequency band may comprise the 617-960 MHz frequency range or a portion thereof (e.g., the 617-896 MHz frequency band, the 696-960 MHz frequency band, etc.). It should be noted that herein like elements may be referred to individually by their full reference numeral (e.g., linear array 220-2) and may be referred to collectively by the first part of their reference numeral (e.g., the linear arrays 220). The low-band linear arrays 220 may or may not be configured to transmit and receive signals in the same portion of the first frequency band. For example, in one embodiment, the low-band radiating elements 222 in the first linear array 220-1 may be configured to transmit and receive signals in the 700 MHz frequency band and the low-band radiating elements 222 in the second linear array 220-2 may be configured to transmit and receive signals in the 800 MHz frequency band. In other embodiments, the low-band radiating elements 222 in both the first and second linear arrays 220-1, 220-2 may be configured to transmit and receive signals in the 700 MHz (or 800 MHz) frequency band.

The first mid-band radiating elements 232 may likewise be mounted to extend upwardly from the main reflector 214 and may be mounted in two columns to form two linear arrays 230-1, 230-2 of first mid-band radiating elements 232. The linear arrays 230-1, 230-2 of mid-band radiating elements 232 may extend along the respective side edges of the main reflector 214. The first mid-band radiating elements 232 may be configured to transmit and receive signals in a second frequency band. In some embodiments, the second frequency band may comprise the 1427-2690 MHz frequency range or a portion thereof (e.g., the 1710-2200 MHz frequency band, the 2300-2690 MHz frequency band, etc.). In the depicted embodiment, the first mid-band radiating elements 232 are configured to transmit and receive signals in the lower portion of the second frequency band (e.g., some or all of the 1427-2200 MHz frequency band). The linear arrays 230-1, 230-2 of first mid-band radiating elements 232 may be configured to transmit and receive signals in the same portion of the second frequency band or in different portions of the second frequency band The second mid-band radiating elements 242 are mounted in four columns in the upper center portion of antenna 100 to form four linear arrays 240-1 through 240-4 of second mid-band radiating elements 242. The second mid-band radiating elements 242 may be configured to transmit and receive signals in the second frequency band. In the depicted embodiment, the second mid-band radiating elements 242 are configured to transmit and receive signals in an upper portion of the second frequency band (e.g., some or all of the 2300-2700 MHz frequency band). In the depicted embodiment, the second mid-band radiating elements 242 may have a different design than the first mid-band radiating elements 232.

The high-band radiating elements 252 are mounted in four columns in the lower center portion of antenna 100 to form four linear arrays 250-1 through 250-4 of high-band radiating elements 252. The high-band radiating elements 252 may be configured to transmit and receive signals in a third frequency band. In some embodiments, the third frequency band may comprise the 3300-4200 MHz frequency range or a portion thereof.

In other embodiments, the number of linear arrays of low-band, mid-band and high-band radiating elements may be varied from what is shown in FIGS. 2-3. For example, the number of linear arrays of each type of radiating elements may be varied from what is shown, some types of linear arrays may be omitted and/or other types of arrays may be added, the number of radiating elements per array may be varied from what is shown, and/or the arrays may be arranged differently. As one specific example, in another embodiment, the four linear arrays 240-1 through 240-4 of second mid-band radiating elements 242 may be replaced with four linear arrays of ultra-high-band radiating elements that transmit and receive signals in a 5 GHz frequency band.

In the depicted embodiment, the low-band and mid-band radiating elements 222, 232, 242 may each be mounted to extend forwardly from the main reflector 214. The high-band radiating elements 252 may each be mounted to extend forwardly from a sub-module reflector, as will be described in further detail below.

Each array 220-1, 220-2 of low-band radiating elements 222 may be used to form a pair of antenna beams, namely an antenna beam for each of the two polarizations at which the dual-polarized radiating elements are designed to transmit and receive RF signals. Likewise, each array 232 of first mid-band radiating elements 232, each array 242 of second mid-band radiating elements 242, and each array 252 of high-band radiating elements 252 may be configured to form a pair of antenna beams, namely an antenna beam for each of the two polarizations at which the dual-polarized radiating elements are designed to transmit and receive RF signals. Each linear array 220, 230, 240, 250 may be configured to provide service to a sector of a base station. For example, each linear array 220, 230, 240, 250 may be configured to provide coverage to approximately 120° in the azimuth plane so that the base station antenna 100 may act as a sector antenna for a three sector base station. Of course, it will be appreciated that the linear arrays may be configured to provide coverage over different azimuth beamwidths. While all of the radiating elements 222, 232, 242, 252 are dual-polarized radiating elements in the depicted embodiment, it will be appreciated that in other embodiments some or all of the dual-polarized radiating elements may be replaced with single-polarized radiating elements. It will also be appreciated that while the radiating elements are illustrated as dipole radiating elements in the depicted embodiment, other types of radiating elements such as, for example, patch radiating elements may be used in other embodiments.

As shown best in FIG. 2, some or all of the radiating elements 222, 232, 242, 252 may be mounted on feed boards 224, 234, 244, 254 that couple RF signals to and from the individual radiating elements 222, 232, 242, 252, with one or more radiating elements 222, 232, 242, 252 mounted on each feed board 224, 234, 244, 254. Cables (not shown) may be used to connect each feed board 224, 234, 244, 254 to other components of the antenna 100 such as diplexers, phase shifters, calibration boards or the like.

Figure 4:
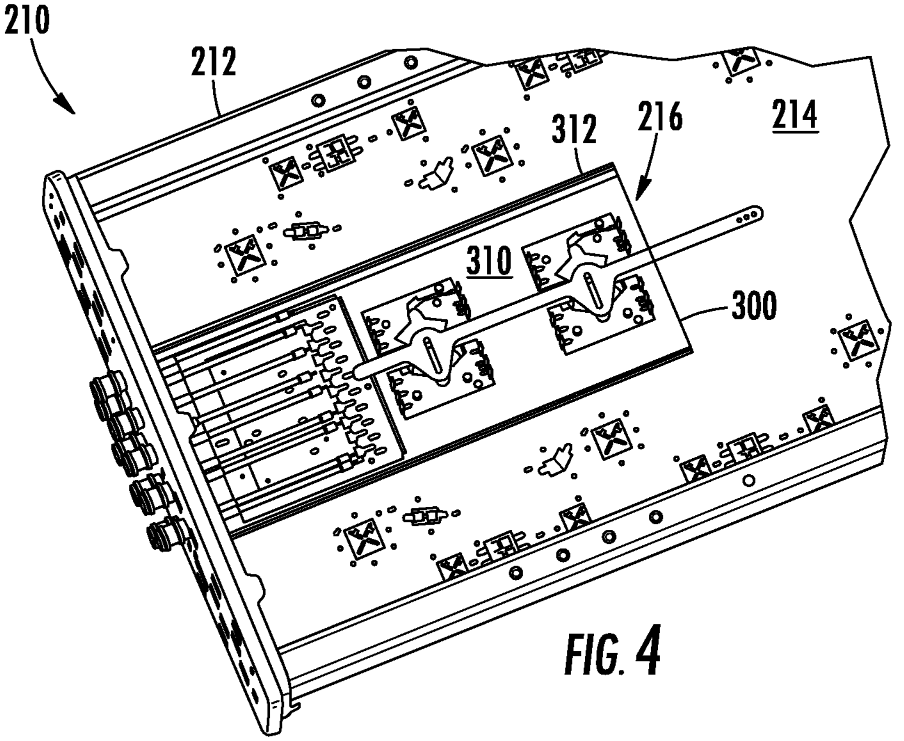
FIG. 4 is a partial back view of a main backplane of the base station antenna of FIG. 1 with the sub-module installed thereon.
Figure 5:
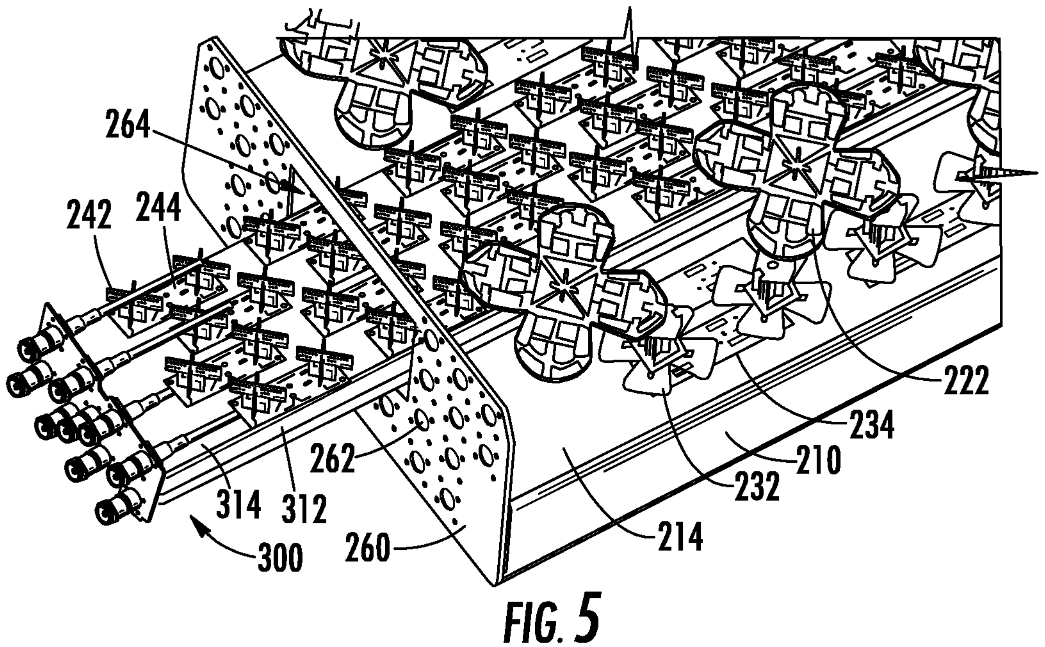
FIGS. 5 and 6 are a partial exploded perspective view and a perspective view, respectively, of the base station antenna of FIG. 1 with the radome and some of the RF ports omitted that illustrates a self-contained sub-module that slidably mates with the main reflector of the antenna.
Figure 6:
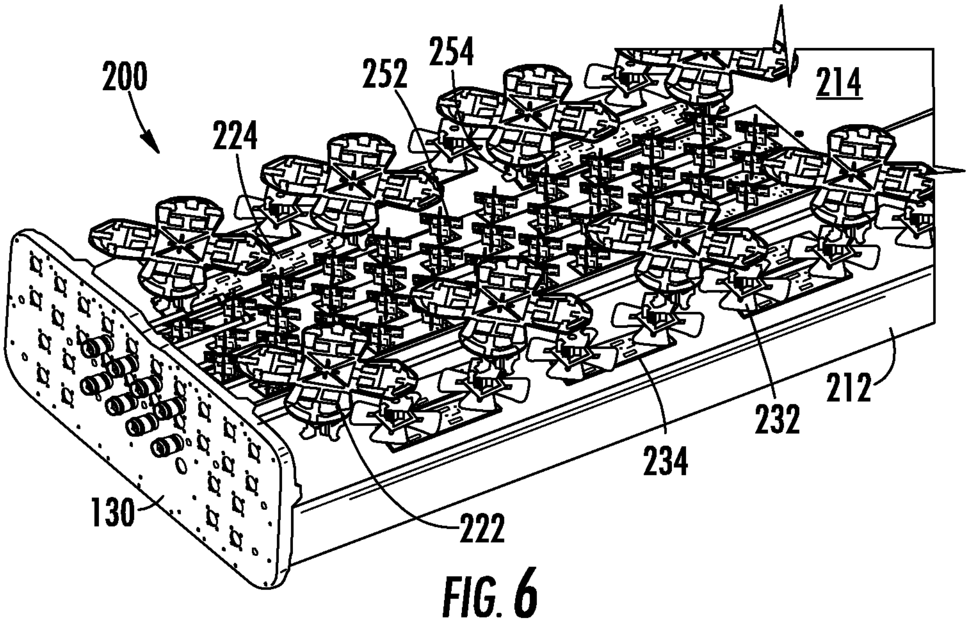
Figure 7:
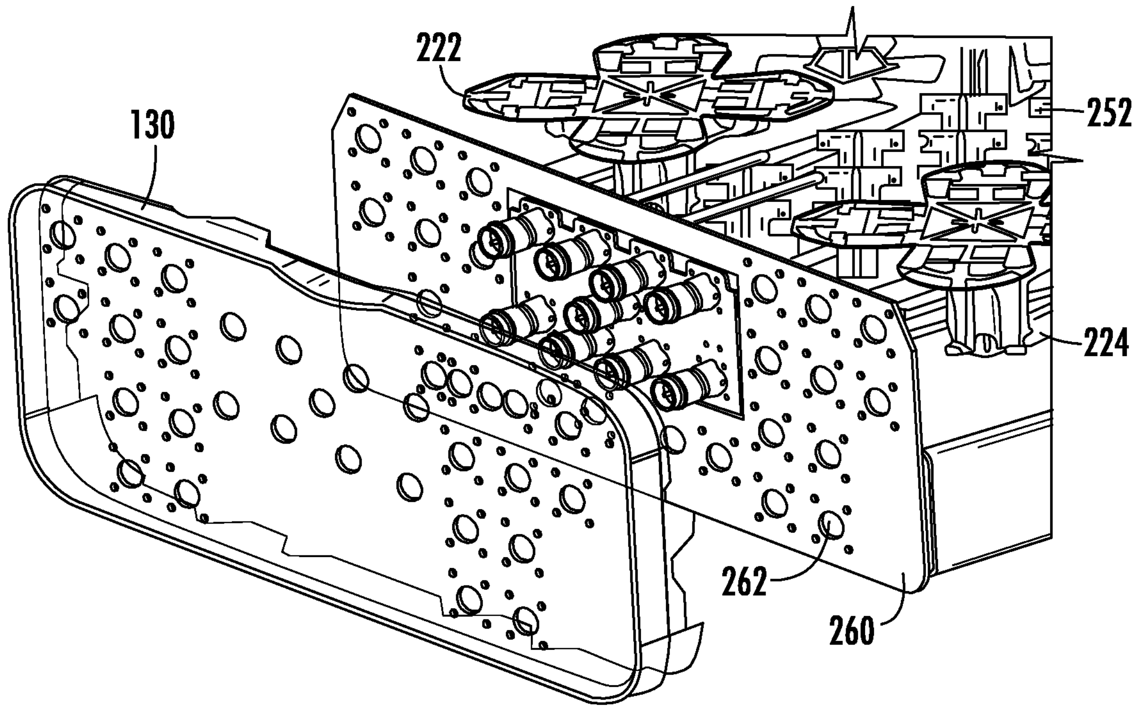
FIG. 7 is another partial exploded perspective view of the base station antenna of FIG. 1 with the radome and some of the RF ports omitted.

As noted above, the base station antennas according to embodiments of the present invention may be reconfigurable antennas that include one or more self-contained sub-modules. The base station antenna 100 includes one such sub-module 300. FIGS. 4-7 illustrate the relationship between the sub-module 300 and the remainder of antenna 100 in greater detail. In particular, FIG. 4 is a partial back view of the main backplane 210 with the sub-module 300 installed thereon. FIGS. 5 and 6 are a partial exploded perspective view and a perspective view, respectively, of the base station antenna 100 that illustrate how the sub-module 300 may slidably mate with the main backplane 210. FIG. 7 is another partial exploded perspective view of the antenna 100 that illustrates an end plate that may be mounted at the bottom of the main backplane 210 just inside the bottom end cap 130.

As shown in FIGS. 4-7, the sub-module 300 may be slidably received on the main backplane 210. As shown best in FIG. 4, in some embodiments, the main reflector 214 may have an opening 216 and the sub-module 300 may be received in the general area of this opening 216 when the antenna 100 is fully assembled. However, it will be appreciated that embodiments of the present invention are not limited thereto, and that one or more smaller openings may be used in other embodiments, or the opening 216 may be omitted entirely.

As shown in FIGS. 5 and 6, the sub-module 300 may be slidably inserted onto the main backplane 210 from the bottom of the antenna 100. FIG. 5 illustrates the sub-module 300 when it has been partially mated with the main backplane 210, while FIG. 6 shows the sub-module 300 after it has been fully installed. As shown best in FIG. 5, an end plate 260 may be mounted at the bottom of the main backplane 210. The end plate 260 may include a plurality of connector openings 262. Various connectors or "ports" (not shown) may be mounted in the bottom end cap and may extend through each connector opening 262. The connectors may include RF connectors for the linear arrays 220, 230, 240 as well as control connectors such as Antenna Interface Signals Group ("AISG") connectors. The end plate 260 may further include a larger sub-module opening 264. The sub-module opening 264 may be sized to allow the sub-module 300 (including the high-band radiating elements 252 mounted thereon) to be inserted through the opening 264 to mate with the main backplane 210. The bottom end cap 130 may be mounted onto the end plate 260.

Provision of the end plate 260 avoids any need to separate the bottom end cap 130 into two pieces, and hence provision of the end plate 260 makes it easy to use a standard one-piece bottom end cap 130. This may improve the ability of the antenna 100 to resist water/moisture ingress. The end plate 260 may be formed of a non-metal material (e.g., plastic) to avoid adding any additional metal-to-metal connections which may be potential source of passive intermodulation ("PIM") distortion.

Figure 8:
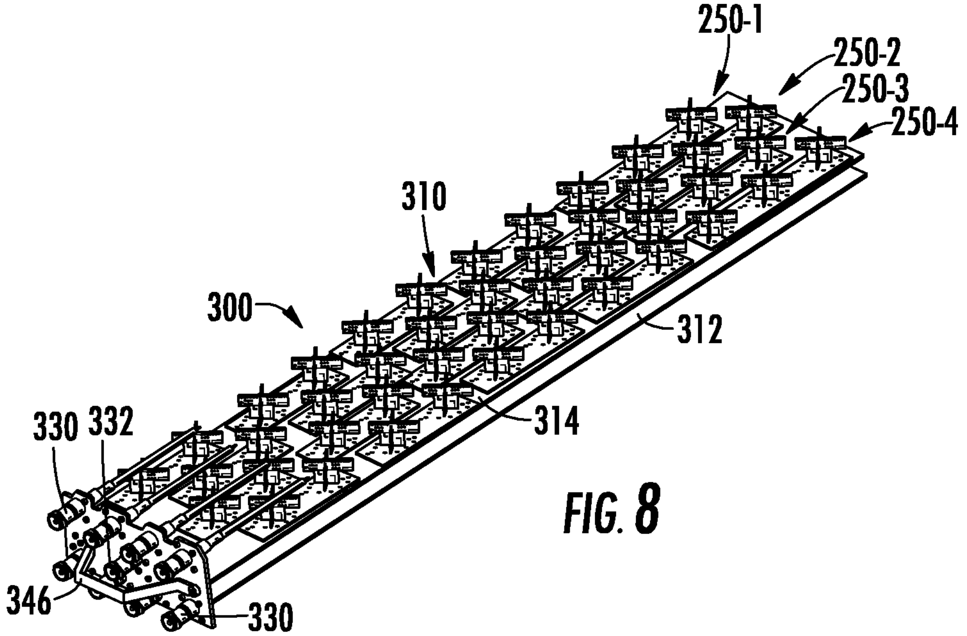
FIG. 8 is a perspective front view of a self-contained sub-module included in the base station antenna of FIG. 1.
Figure 9:
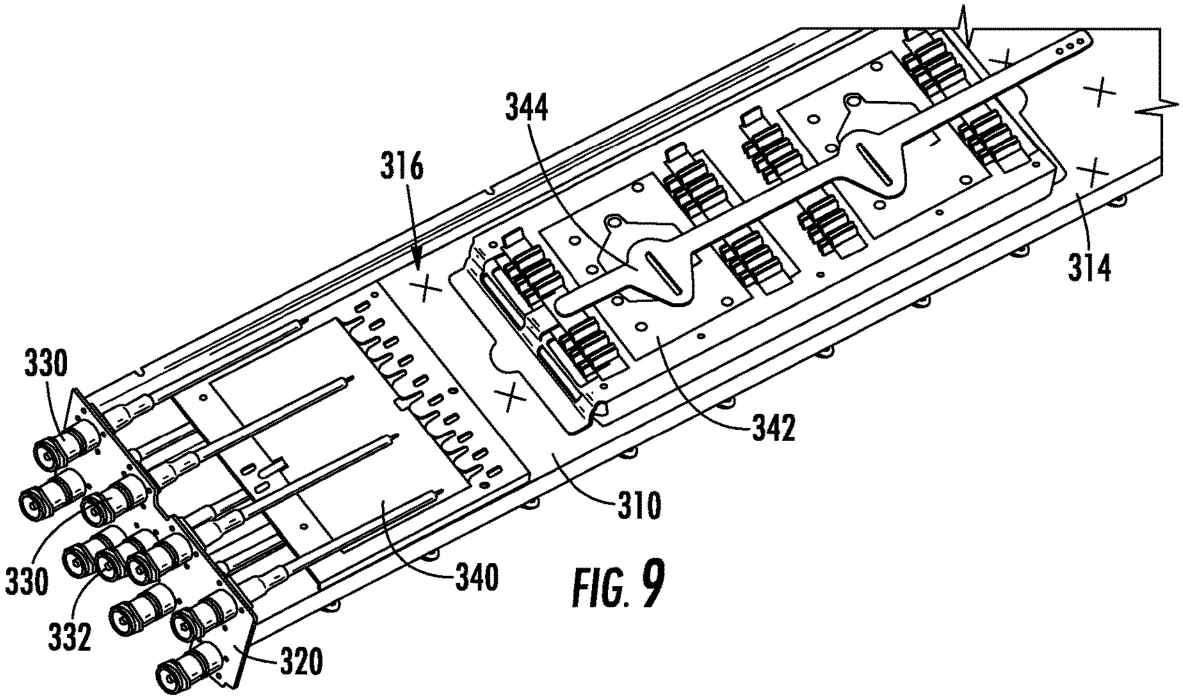
FIG. 9 is a rear perspective back view of the sub-module shown in FIG. 8.
Figure 10:
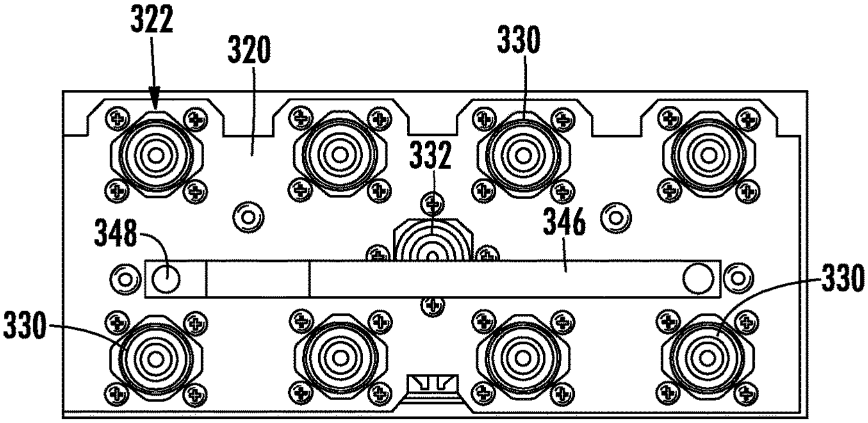
FIG. 10 is an end view of the sub-module shown in FIG. 8.
Figure 11:
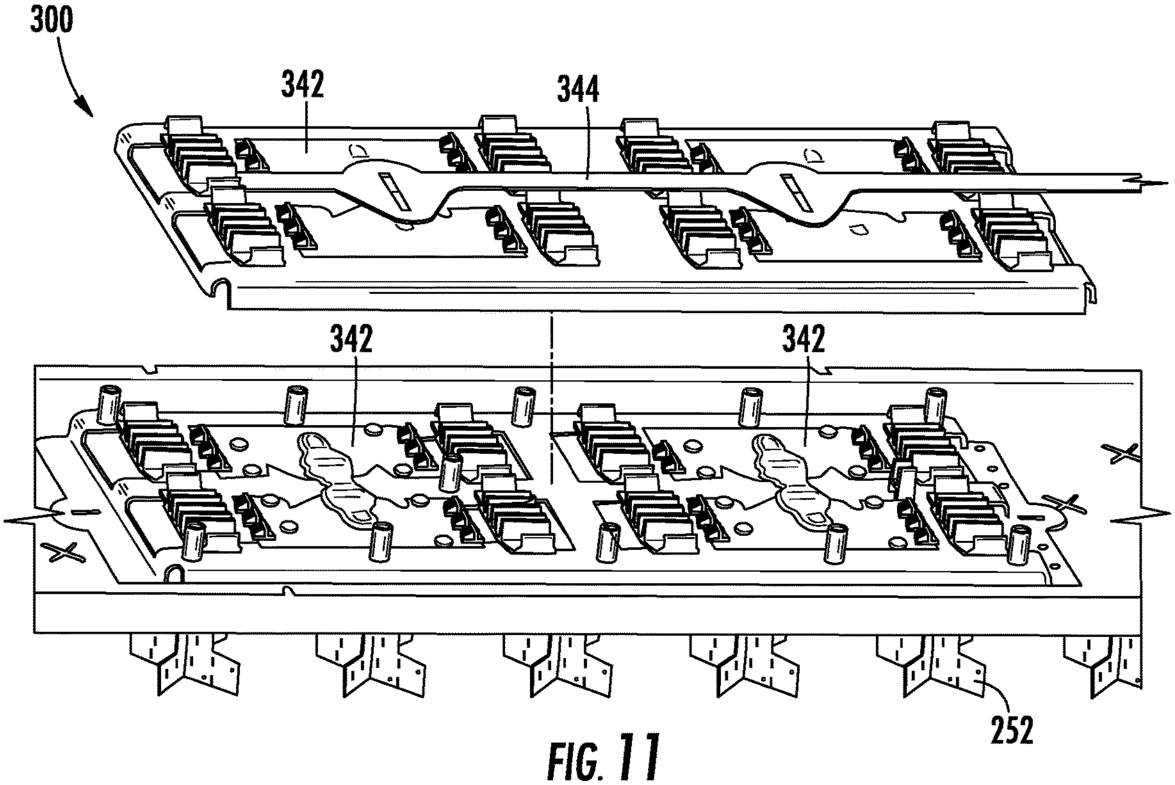
FIGS. 11 and 12 are a partial exploded perspective back view and a back view, respectively, of the sub-module shown in FIG. 8 that illustrates the phase shifters included in the sub-module.
Figure 12:
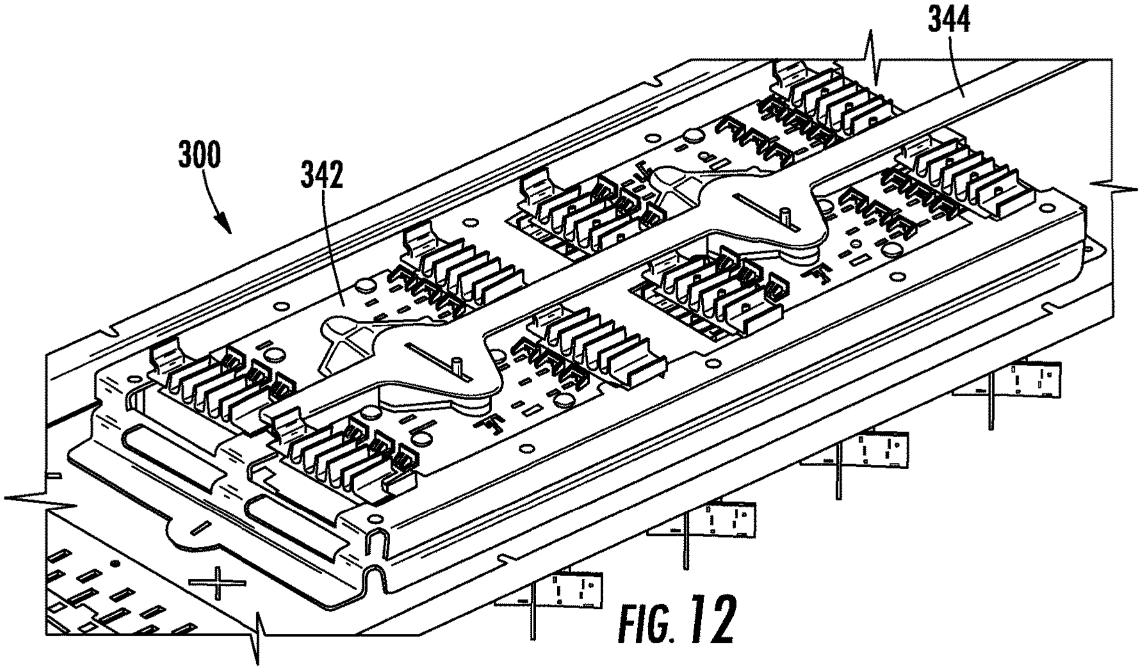

FIGS. 8-12 are various views of the sub-module 300. In particular, FIGS. 8 and 9 are perspective front and rear views, respectively of the sub-module 300, FIG. 10 is an end view of the sub-module 300, and FIGS. 11 and 12 are a partial exploded perspective back view and a back view, respectively, of the sub-module 300 that illustrates the phase shifters included therein.

As shown in FIGS. 2-3 and 8-12, the sub-module 300 includes a sub-module backplane 310. The sub-module backplane 310 may include sidewalls 312 and a sub-module reflector 314. The four linear arrays 250 of high-band radiating elements 252 are mounted to extend forwardly from the sub-module reflector 314. As can best be seen in FIG. 3, the sub-module reflector 314 may be mounted forwardly of the main reflector 214. This may advantageously position the high-band radiating elements 252 closer to the radome 110 so that the radome 110 is within the near field of the high-band radiating elements 252.

The rear surface of the sub-module reflector 314 and the sidewalls 312 may define a chamber 316. A sub-module end plate 320 may be mounted on the bottom end of the sub-module 300. The sub-module end plate 320 may include a plurality of openings 322. Various connectors 330, 332 may be mounted in the openings 322. In particular, eight RF connectors or "ports" 330 may be provided that are used to couple high-band RF signals between a high-band radio (not shown) and the linear arrays 250 of high-band radiating elements 250 included in sub-module 300. Two RF ports are provided for each high-band linear array 250, namely a first RF port 330 that couples first polarization high-band RF signals between the high-band radio and the linear array 250 and a second RF port 330 that couples second polarization high-band RF signals between the high-band radio and the linear array 250. As the radiating elements 252 are slant cross-dipole radiating elements, the first and second polarizations may be a −45° polarization and a +45° polarization.

As shown best in FIGS. 9 and 11-12, various electronic and/or mechanical components may be mounted in the chamber 316 including a calibration circuit 340, phase shifters 342, and mechanical linkages 344 along with various cables, connectors and/or other RF transmission paths that provide RF transmission paths from the RF ports 330 to the high-band radiating elements 252 through the calibration circuit 340 and phase shifters 342, as well as RF transmission paths from the RF ports 330 to the calibration circuit 340 and back to the calibration port 332. Most of the cables/connectors are omitted in the drawings to simplify the figures. In some embodiments, the calibration circuit 340 may be implemented as a calibration circuit board that includes a plurality of power dividers and power combiners implemented therein.

As shown in FIGS. 8 and 10, a re-useable, removable plastic handle 346 may be provided that may assist in slidably inserting the sub-module 300 to mate with the main backplane 214 and in later removing the sub-module from the antenna 100. The re-useable plastic handle 346 may include captive screws 348 that may be inserted into threaded openings in the sub-module end plate 320. The plastic handle 346 is removed prior to installation of the bottom end cap 130.

As shown in FIGS. 11-12, in the depicted embodiment, a total of eight phase shifters 342 are mounted in the sub-module 300. The eight phase shifters 342 are stacked in two layers of four phase shifters 342 each. Each phase shifter 342 may be connected to a respective one of the RF ports 330. The phase shifters 342 may be implemented as, for example, wiper arc phase shifters such as the phase shifters disclosed in U.S. Pat. No. 7,907,096 to Timofeev, the disclosure of which is hereby incorporated herein in its entirety. The phase shifters 342 may be mounted side-by-side in pairs. A mechanical linkage 344 may be coupled to at least one of the phase shifters 342. The mechanical linkage 344 may be coupled to a RET actuator (not shown). The RET actuator may be part of the sub-module 300 or may be part of the main module. The RET actuator may apply a force to the mechanical linkage 344 which in turn adjusts a moveable element on the phase shifter in order to adjust the downtilt angle for one or more of the high-band linear arrays 250. The downtilt for each high-band linear array 250 may be independently adjustable in some embodiments, while in other embodiments the same downtilt may be applied to all of the high-band linear arrays 250.

Notably, the sub-module 300 may comprise a self-contained sub-module that includes all of components of antenna 100 that are along the RF paths for the four high-band linear arrays 250 that are included in the sub-module 300. Consequently, the sub-module 300 may be fully operable to transmit and receive RF signals regardless of whether or not the sub-module 300 is mounted within the remainder of antenna 100. This may be highly advantageous as it allows the sub-module 300 to be tested and calibrated separately from the remainder of antenna 100. For example, if the sub-module 300 includes a beamforming antenna (as in the case of the antenna 100), then a calibration process must be performed to determine differences in the amplitude and/or phase along the RF paths so that these differences can be accommodated for by the radio. This calibration process may be performed after the sub-module 300 is fabricated but before the sub-module 300 is mated with the remainder of antenna 100. Likewise, various RF tests are performed for each linear array in order to identify any potential problems such as, for example, PIM sources along the RF path, faulty connections, misaligned elements and the like so that these problems may be corrected. Once again, since the sub-module 300 is self-contained, these tests and any necessary reworking of the sub-module 300 may be performed before the sub-module 300 is mated with the remainder of the antenna 100.

Figure 13:
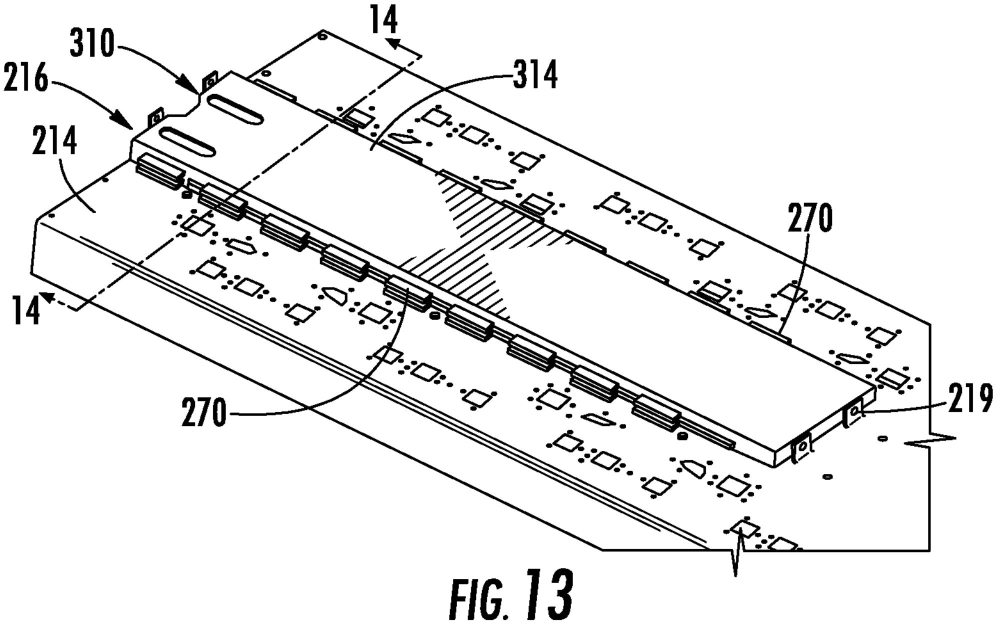
FIG. 13 is a perspective view of a main backplane and the sub-module backplane of the antenna of FIG. 1 that illustrates rails that can be mounted on the main backplane and guides that may be included on the sub-module to allow the sub-module to be slidably mated on the main backplane.
Figure 14:
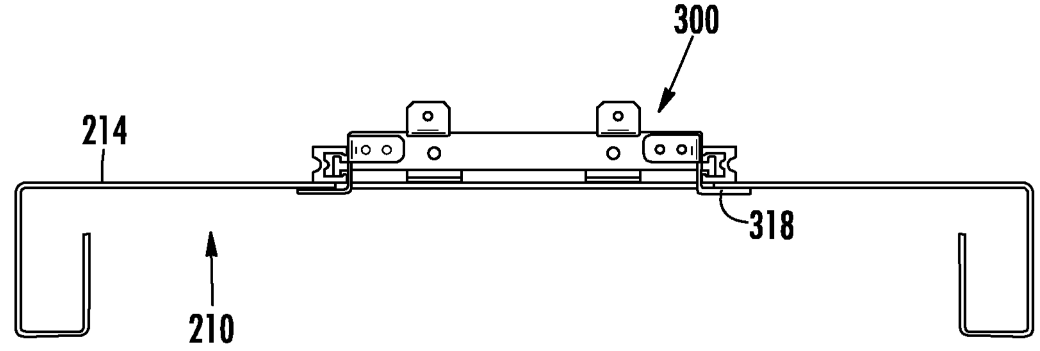
FIG. 14 is a cross-sectional view taken along line 14-14 of FIG. 13.
Figure 15:
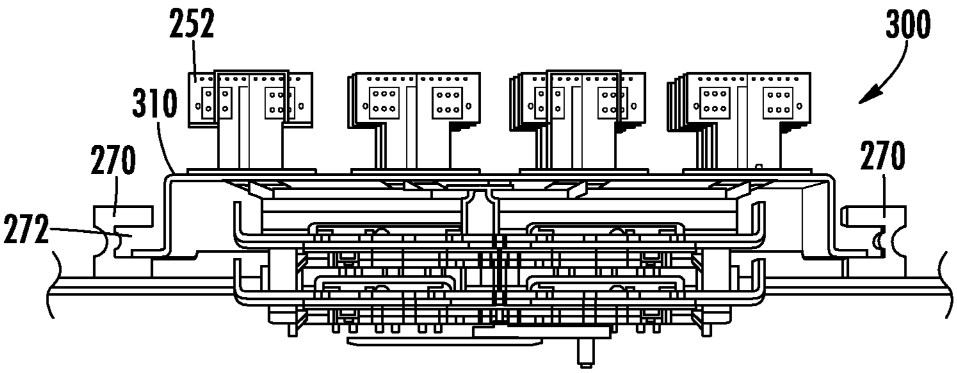
FIG. 15 is an enlarged cross-sectional view of the full sub-module shown in FIG. 8 mounted on the main backplane.
Figure 16:
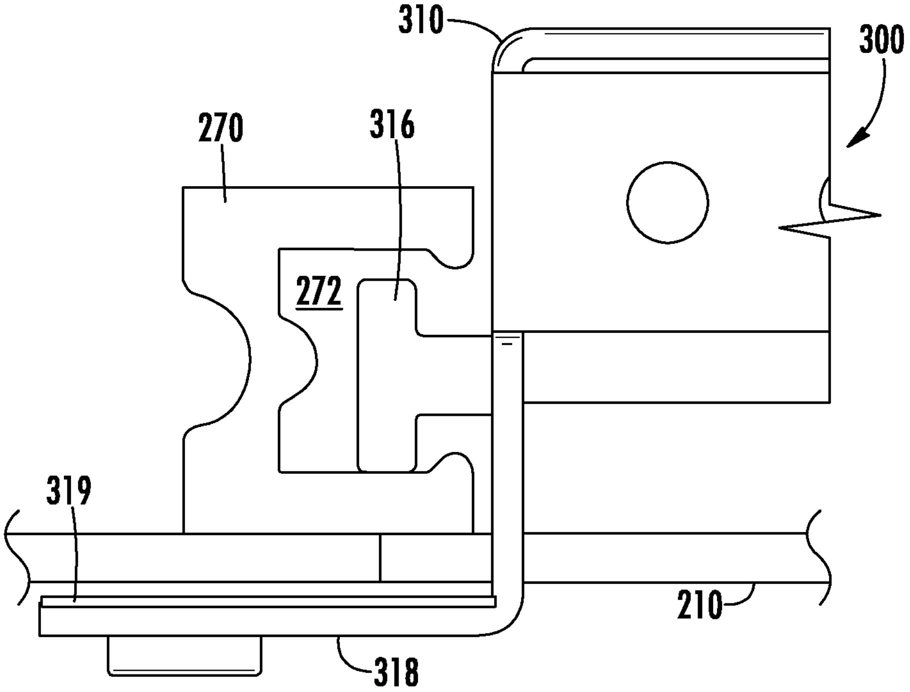
FIG. 16 is an enlarged cross-sectional view taken along a portion of line 14-14 of FIG. 13 that illustrates a guide and rail system that allows the sub-module to be slidably mounted on the main backplane.
Figure 17:
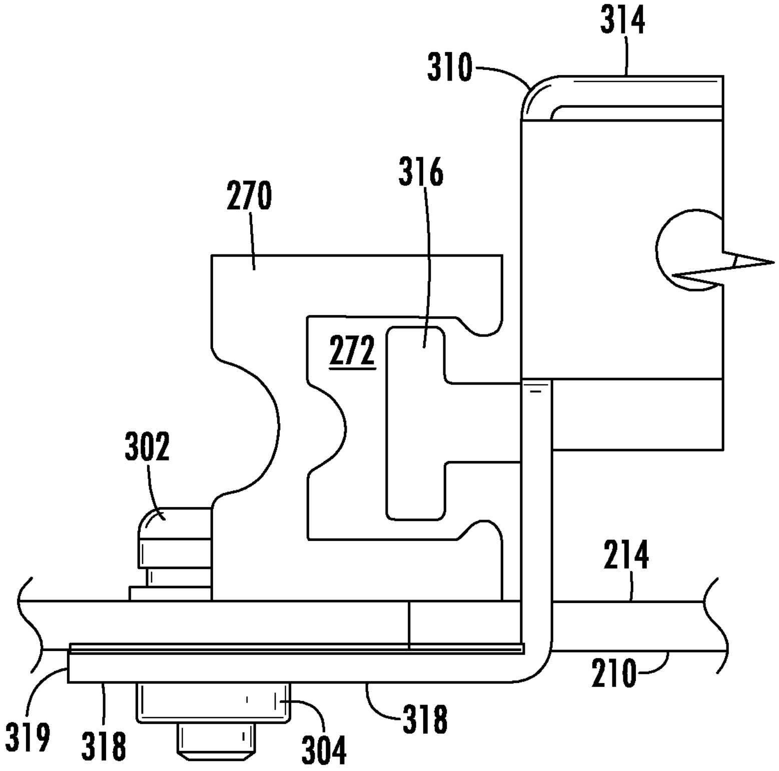
FIG. 17 is another enlarged cross-sectional view taken along a portion of line 14-14 of FIG. 13 that illustrates how fasteners may be used to fix the sub-module to the main backplane.

FIGS. 13-17 are various views of portions of the main backplane 210 and the sub-module backplane 310 of the antenna 100 that show a guide and rail system that may be used to slidably mate the sub-module 300 with the main backplane 210. In particular, FIGS. 13 and 14 are a perspective view and a cross-sectional view, respectively, of the main backplane 210 and the sub-module backplane 310, FIG. 15 is an enlarged cross-sectional view of the full sub-module 300 mounted on the main backplane 210, and FIGS. 16 and 17 are enlarged cross-sectional views that illustrate the guide and rail system in greater detail.

As shown in FIGS. 13-17, a plurality of guides 270 may be mounted along either side of the opening 216 in the main reflector 214. The guides 270 may be aligned in two rows that extend in the longitudinal direction of antenna 100. While a plurality of guides 270 are provided on each side of the opening 216, it will be appreciated that in other embodiments a single guide may be provided. Each guide 270 may comprise, for example, a channel iron that defines a channel 272. The backplane 310 of sub-module 300 includes a pair of rails 316 that may extend outwardly along either side of the backplane 310. Each rail 316 may extend in the longitudinal direction of the antenna 100. Each rail 316 may be received in a respective one of the channels 272 of the guides 270 as the sub-module 300 is slid into the antenna assembly 200.

As can best be seen in FIGS. 16-17, the sub-module backplane 310 includes a pair of outwardly extending lips 318 that are positioned behind the main reflector 214 when the sub-module 300 is slidably mated with the remainder of the antenna assembly 200. An insulating spacer 319 such as, for example, a mylar gasket may be interposed between each lip 318 and the rear surface of the main reflector 214 to prevent direct metal-to-metal contact therebetween. This may help improve the PIM performance of the antenna 100. The lip 318, insulating spacer 319 and main reflector 214 may form a capacitor so that the sub-module reflector 314 is capacitively connected to the main reflector 214. The insulating spacer 319 may be adhesively attached to one of the lip 318 or the main reflector 214 in some embodiments. The insulating spacer 319 may ensure that a consistent capacitance is provided between the main reflector 214 and the sub-module reflector 314.

As shown in FIG. 17, once the sub-module 300 is at its proper mounting location within the antenna assembly 200, fasteners such as bolts 302 may be inserted through respective openings in the lips 318 and the main reflector 214 and threaded into corresponding nuts 304 in order to firmly affix the sub-module 300 to the main reflector 214. In some embodiments, non-metallic bolts and nuts may be used.

Figure 18:
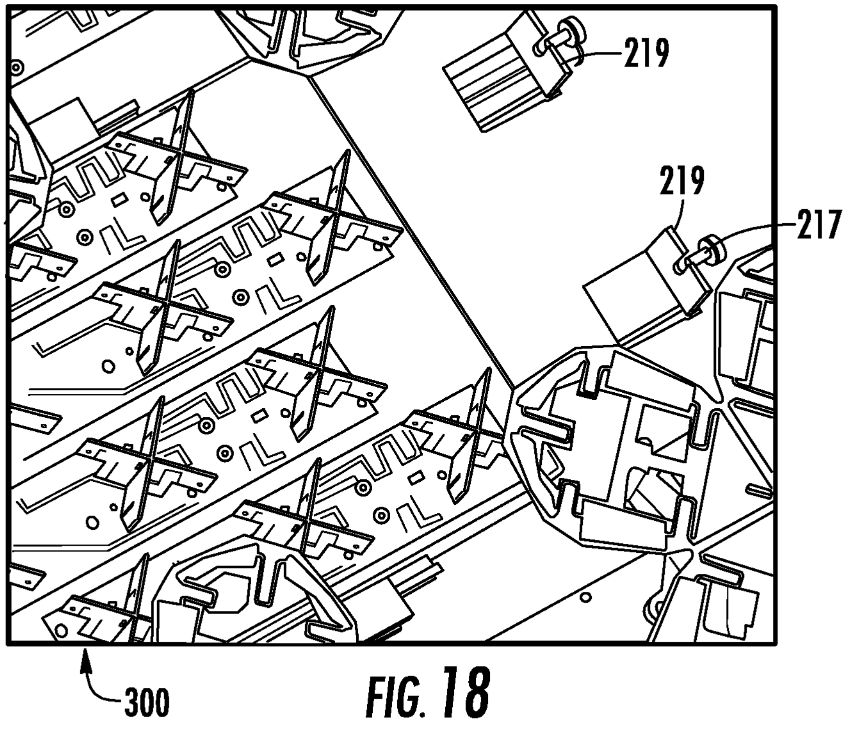
FIGS. 18 and 19 are perspective views that illustrate stops that may be provided on the main backplane to facilitate mounting the sub-module in the proper location on the main backplane.
Figure 19:
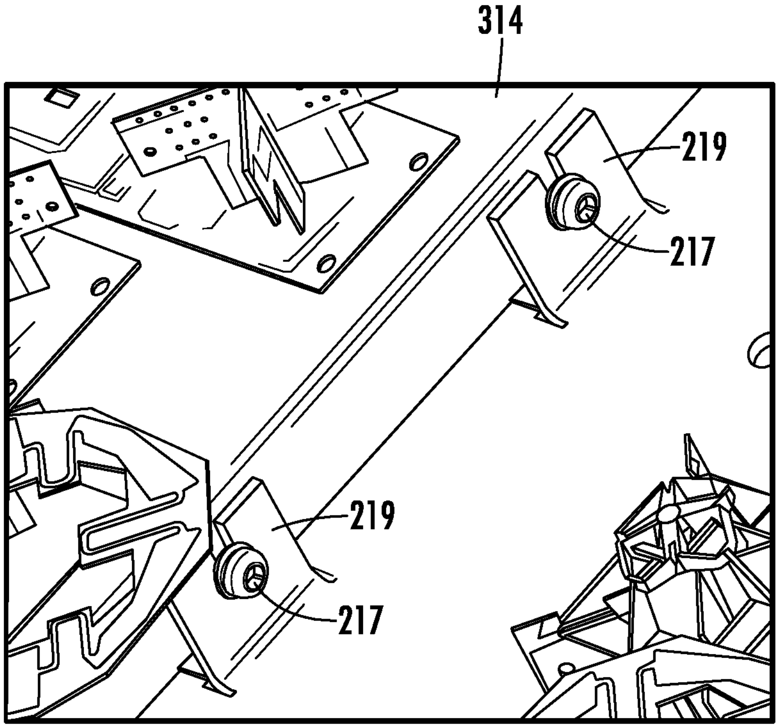

As can be seen in FIGS. 13 and 18-19, one or more stops 219 may be mounted on or otherwise formed in the main reflector 214. The stops 219 prevent the sub-module 300 from sliding beyond the stops 219 and further into the antenna assembly 200. Thus, the stops 219 may ensure that the sub-module 300 is consistently mounted in the correct location within the antenna assembly 200. The stops 219 can be formed, for example, by punching a U-shaped opening in the main reflector 214 and then bending upwardly the portion of the main reflector 214 within the U-shaped opening to create an upwardly extending tab that acts as the stop 219. Multiple tabs/stops 219 may be provided. As can be seen in FIGS. 18-19, the tab 219 may include a slot or aperture that receives a bolt 217. Once the sub-module 300 has been fully inserted into the antenna assembly 200, the bolt 217 may be used to firmly affix the sub-module backplane 310 to the stop 219. In some embodiments, the bolt 217 (and a corresponding nut) may be formed of a non-metallic material, and an insulating washer may be provided between the tab 219 and the sub-module backplane 310. This may ensure that there is no metal-to-metal contact between the main reflector (which tab 219 is part of) and the sub-module backplane 310 that could potentially generate PIM distortion. In other embodiments, a direct galvanic connection may be provided between tab 219 and the sub-module backplane 310 that provides a galvanic earth grounding connection to the sub-module reflector 314.

In other embodiments, the stop 219 may be formed by mounting a forwardly-extending structure on the main reflector 214 instead of by forming upwardly (or downwardly) extending tabs in the main reflector 214.

Figure 20:
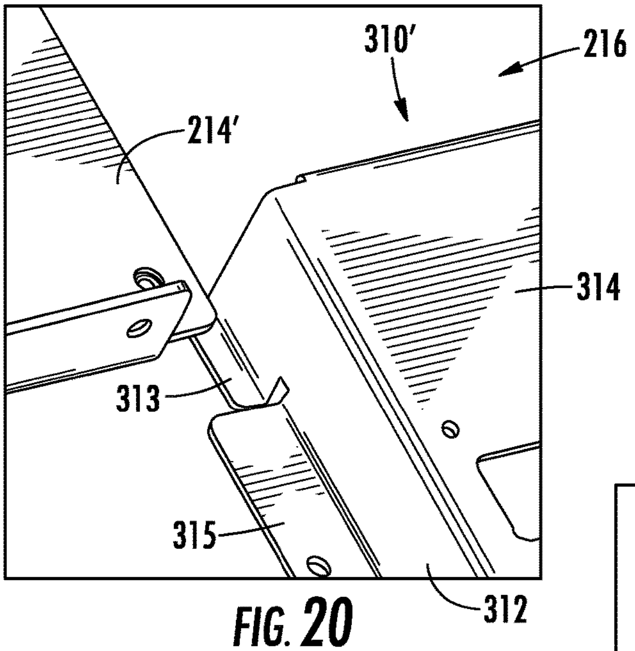
FIG. 20 is a partial perspective view of the main backplane and the sub-module backplane that illustrate cooperating flanges that may be provided on the sub-module backplane to allow the sub-module to be slidably mated on the main backplane.
Figure 21:
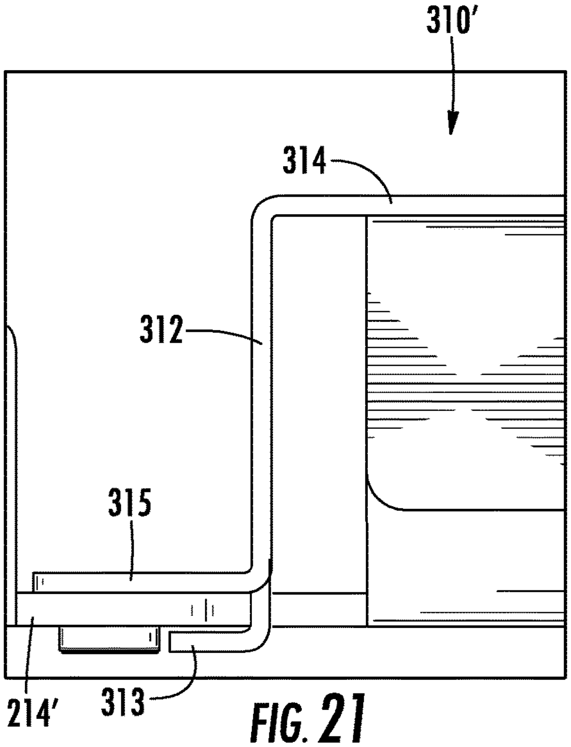
FIG. 21 is a partial cross-sectional view of the sub-module of FIG. 20 mounted on the main backplane.
Figure 22:
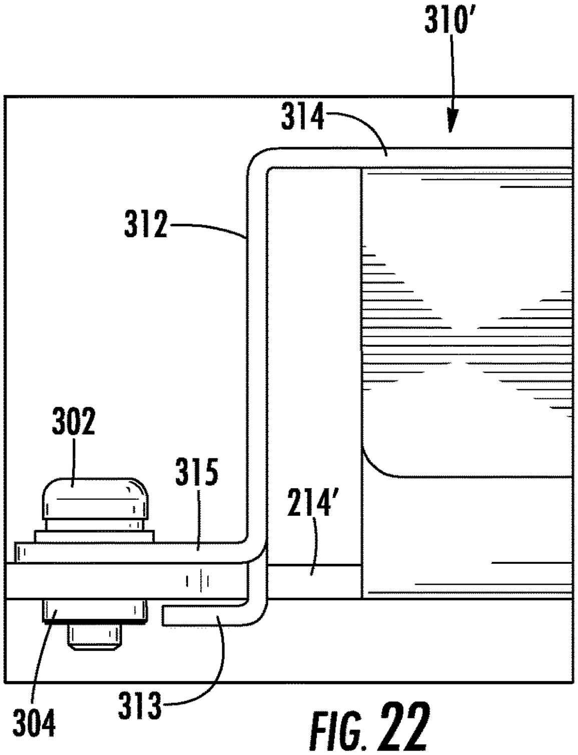
FIG. 22 is a partial cross-sectional view of the sub-module of FIG. 20 mounted on the main backplane with a fastener used to fix the sub-module to the main backplane.

FIGS. 20-22 illustrate a modified version of base station antenna 100 that includes main reflector 214' and a sub-module backplane 310' that slidably mate in a different manner than discussed above. In particular, FIG. 20 is a partial perspective view of the main reflector 214' and the sub-module backplane 310' and FIGS. 21 and 22 are partial cross-sectional views thereof.

As shown in FIGS. 20-22, the main reflector 214' may include an opening 216 that may be approximately the same size (when viewed from the front of the antenna 100) as the sub-module 300. The sub-module backplane 310' includes a sub-module reflector 314, a pair of opposed sidewalls 312 that extend rearwardly from the sub-module reflector 314 (only one of the sidewalls 312 is visible in the figures), and one or more outwardly extending first lips 313 as well as one or more outwardly extending second lips 315 that extend from the rear of each sidewall 312. The first and second lips 313, 315 may be positioned at different distances from a plane defined by the sub-module reflector 314. In particular, the first lips 313 may be located farther behind the plane defined by the sub-module reflector 314 than are the second lips 315. As a result, when the sub-module 300 is slidably mated with the main reflector 214', the first lips 313 may be behind the main reflector 214' and the second lips 315 may be forward of the main reflector 214', and edges of the opening 216 in the main reflector 214' may be captured between the first and second lips 313, 315.

An insulating spacer 319 (FIGS. 16-17) such as, for example, a mylar gasket may be interposed between each lip 313, 315 and the corresponding surfaces of the main reflector 214' to prevent direct metal-to-metal contact therebetween. This may help improve the PIM performance of the antenna 100. The lips 313, 315, insulating spacer 319 and main reflector 214' may form a capacitor so that the sub-module backplane (including the reflector 314) is capacitively connected to the main reflector 214'. The insulating spacer 319 may be adhesively attached to one of the lips 313, 315 or the main reflector 214' in some embodiments.

As shown in FIG. 22, once the sub-module 300 is at its proper mounting location within the antenna assembly 200, fasteners such as bolts 302 may be inserted through respective openings in the second lips 315 and the main reflector 214' and threaded into corresponding nuts 304 in order to firmly affix the sub-module 300 to the main reflector 214'. In some embodiments, non-metallic bolts and nuts may be used.

Figure 23:
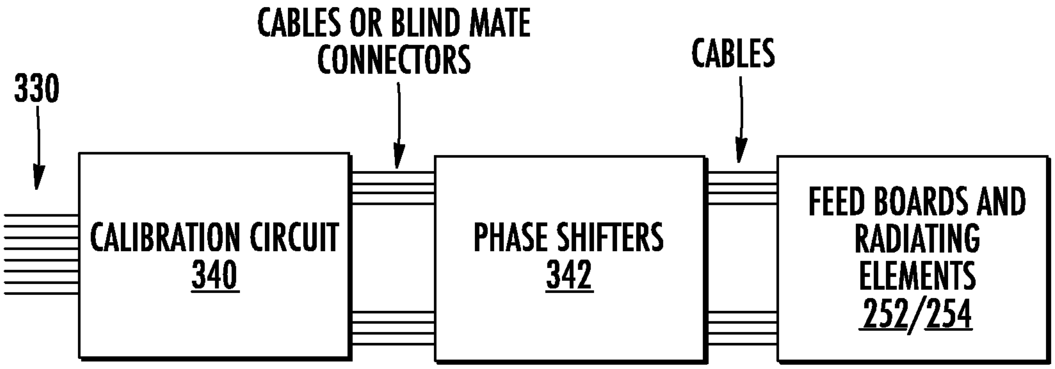
FIG. 23 is a schematic block diagram of the RF path for a sub-module according to embodiments of the present invention.
Figure 24:
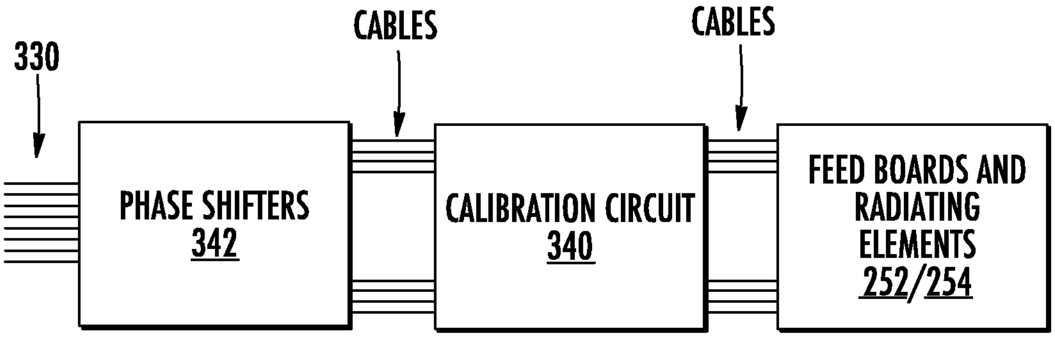
FIG. 24 is a schematic block diagram of the RF path for a sub-module according to further embodiments of the present invention.

Typically, the calibration circuit 340 of a beamforming antenna is interposed on the electrical paths between the RF ports 330 and the phase shifters 342, as is schematically shown in FIG. 23. However, in some embodiments, the calibration module 340 may instead be interposed on the electrical paths between the phase shifters 342 and the radiating elements 252, as is schematically shown in FIG. 24. Typically, coaxial cables are used to connect the calibration circuit 340 to the phase shifters 342. In some embodiments, however, blind mate connectors may be used to connect the calibration circuit to the phase shifters in order to reduce the number of jumper cable connections. As is further shown in FIG. 24, either cables or printed circuit board-to-printed circuit board connectors may be used to connect the calibration circuit 340 to the feed board assemblies 244.

Figure 25:
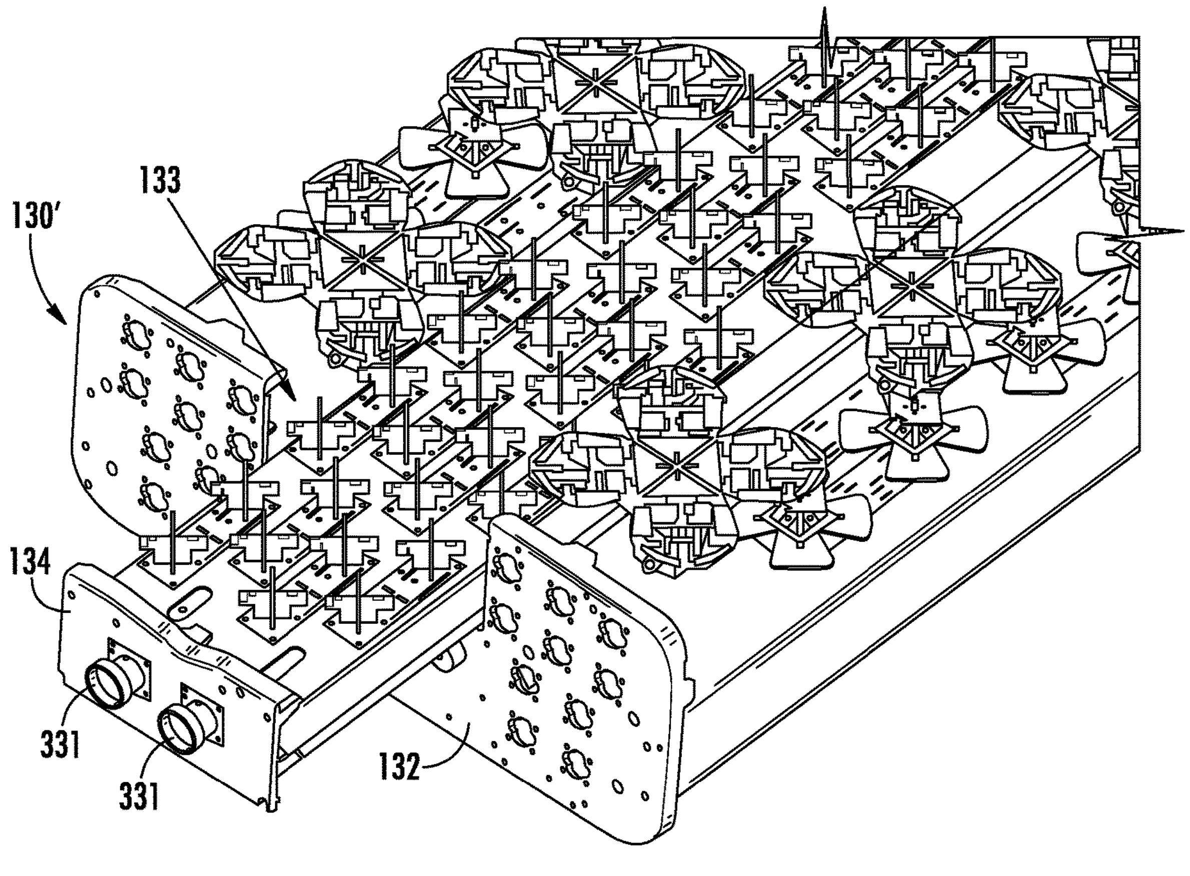
FIG. 25 is a perspective view of an antenna according to further embodiments of the present invention that includes a two piece bottom end cap.

While the antennas discussed above include main backplanes that include a lower end plate, and a one-piece bottom end cap 130 that covers the lower end plate, it will be appreciated that embodiments of the present invention are not limited thereto. For example, in other embodiments, the lower end plate may be omitted, and a bottom end cap 130' may be provided that includes two separate pieces 132, 134, as shown in FIG. 25. Piece 132 may comprise a conventional bottom end cap that has a cut-out area 133. Piece 134 may be part of a self-contained sub-module and may have a plurality of RF ports 330 (FIG. 8) mounted therein that are connected to the radiating elements 252 (FIG. 2) included in the sub-module 300. This design may be simpler, but also may not be structurally as robust and/or as water resistant as the antennas described herein that include one-piece bottom end caps 130. It should be noted that the antenna illustrated in FIG. 25 has a multi-connector RF port 331 (also referred to as a “cluster” connector) as opposed to eight individual RF ports 330.

It will also be appreciated that the sub-module need not be configured to slidably mate with the remainder of the antenna assembly. For example, in some embodiments, the sub-module may simply be placed on the main reflector and secured in place using, for example, fasteners. Such a design may be simpler and cheaper to implement. However, in some antennas, there may not be sufficient room to directly place the sub-module onto the main reflector in this fashion (i.e., without sliding) because some of the radiating elements may overlie the sub-module reflector in the completed antenna, and hence prevent simply placing the sub-module on the main reflector. This is the case, for example, with the base station antenna 100, as FIG. 2 shows that the low-band radiating elements 222 extend overlap the outer linear arrays 250 of high-band radiating elements 252 that are included in the sub-module 300.

The use of self-contained sub-modules may be particularly advantageous with respect to beamforming antennas, as beamforming antennas require additional calibration steps that increase the time required to configure the antenna. By forming some or all of the beamforming portion of a multi-band antenna using self-contained sub-modules, each sub-module may be calibrated and tested separately, allowing the calibration and test operations to be performed in parallel and hence completed more quickly. It may also be much easier to rework components of the sub-module that fail such tests, as technicians have ready access to the rear side of the sub-module reflector and the components mounted thereon. Thus, for example, it may be much easier to remove and replace faulty solder joints in a sub-module according to embodiments of the present invention.

Figure 26:
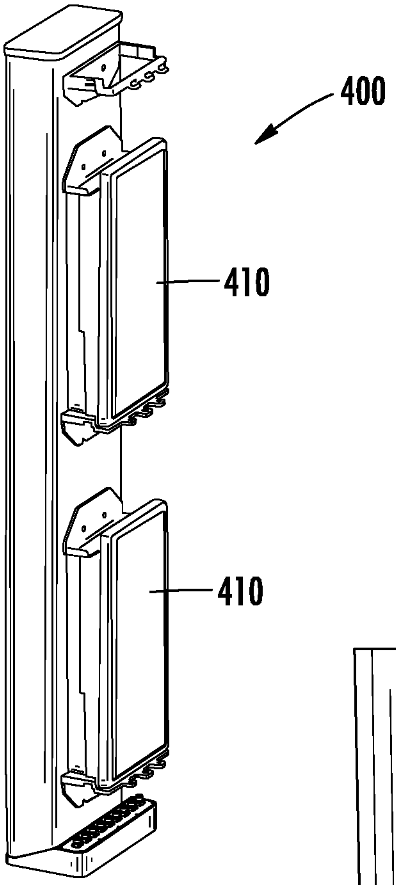
FIG. 26 is a perspective view of a base station antenna according to further embodiments of the present invention.
Figure 27:
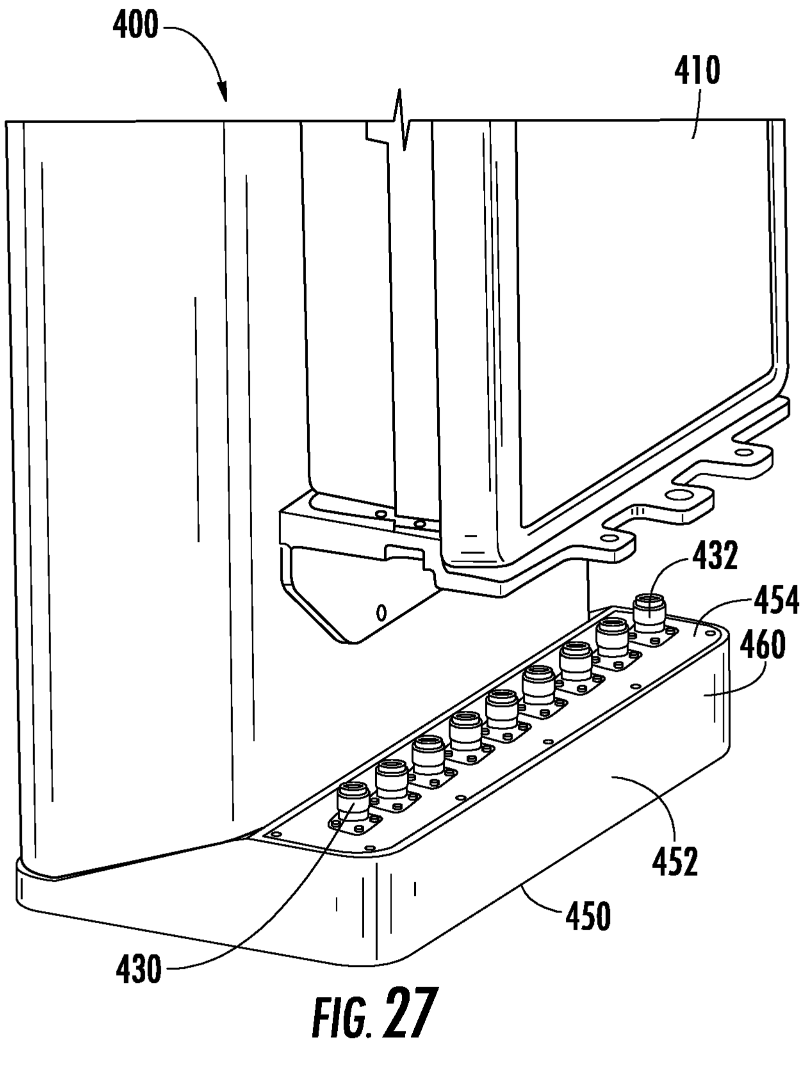
FIG. 27 is an enlarged partial perspective view of the base station antenna of FIG. 26.

FIG. 26 is a perspective view of a base station antenna 400 according to further embodiments of the present invention. FIG. 27 is an enlarged partial perspective view of the base station antenna 400 of FIG. 26. The base station antenna 400 can be similar to the base station antenna 100 that is described above, except that base station antenna 400 has a pair of radios 410 mounted on the rear surface thereof. In addition, the RF ports 430 and the calibration port 432 that are used to connect the high-band linear arrays 250-1 through 250-4 to the radios may be mounted in a bottom end cap 450. As shown in FIGS. 26-27, the RF ports 430 and the calibration port 432 may extend upwardly from an upper surface 454 of a rearwardly extending lip 452 included on the bottom end cap 450. The high-band linear arrays 250-1 through 250-4 may be part of a self-contained sub-module 460 of antenna 400 in the same manner described above with reference to base station antenna 100, with the primary difference between sub-modules 300 and 460 being that in sub-module 460 the RF ports 430 and the calibration ports 432 have the different configuration shown in FIGS. 26-27.

Pursuant to further embodiments of the present invention, base station antennas are provided which have one or more radios mounted on the back of the antenna to provide an antenna assembly. The base station antennas included in these antenna assemblies may have arrays of connector ports (or other connections) for the radios mounted on the rear surface of the base station antenna, which may provide both design and performance advantages. In some embodiments, the base station antennas may be designed so that radios manufactured by any original equipment manufacturer may be mounted on the back of the antenna. This allows cellular operators to purchase the base station antennas and the radios mounted thereon separately, providing greater flexibility to the cellular operators to select antennas and radios that meet operating needs, price constraints and other considerations. Various embodiments of these base station antennas will be discussed in further detail with reference to FIGS. 28A-36.

Figure 28A:
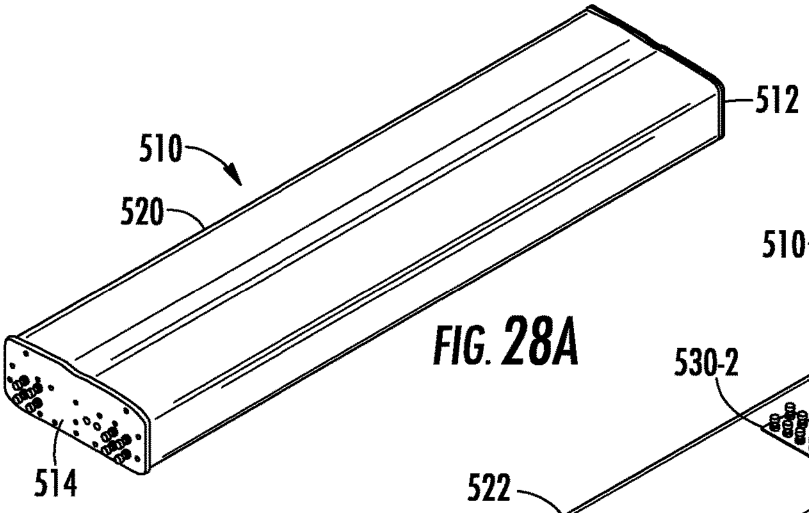
FIG. 28A is a front perspective view of a base station antenna according to further embodiments of the present invention.
Figure 28B:
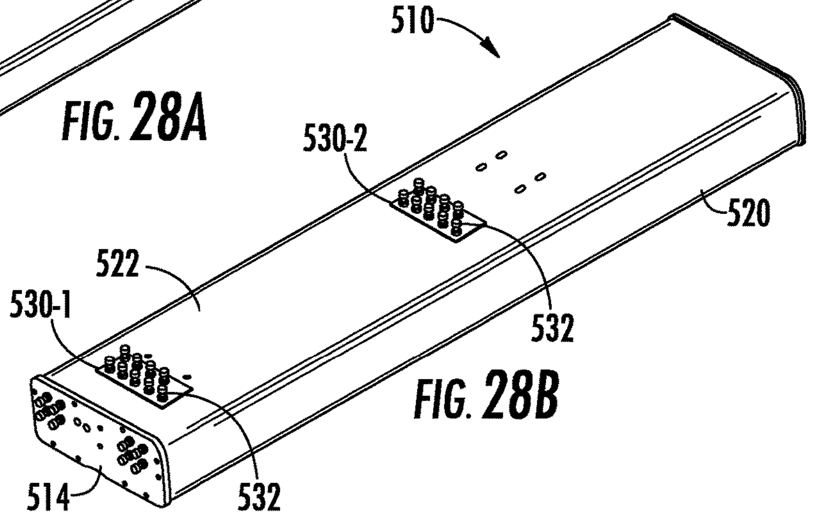
FIG. 28B is a back perspective view of the base station antenna of FIG. 28A.
Figure 28C:
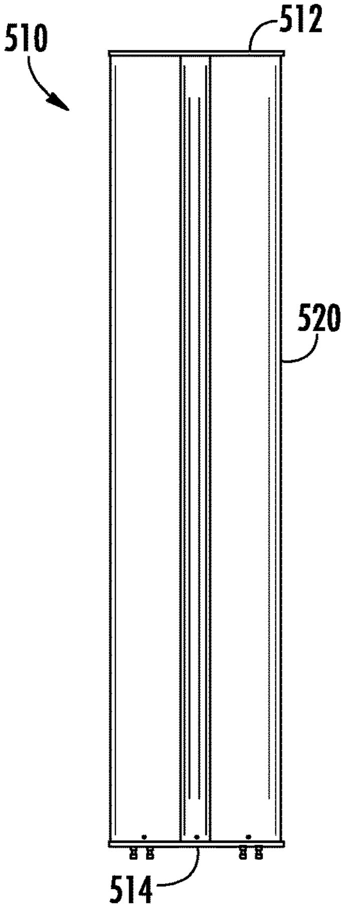
FIG. 28C is a front view of the base station antenna of FIG. 28A.
Figure 28D:
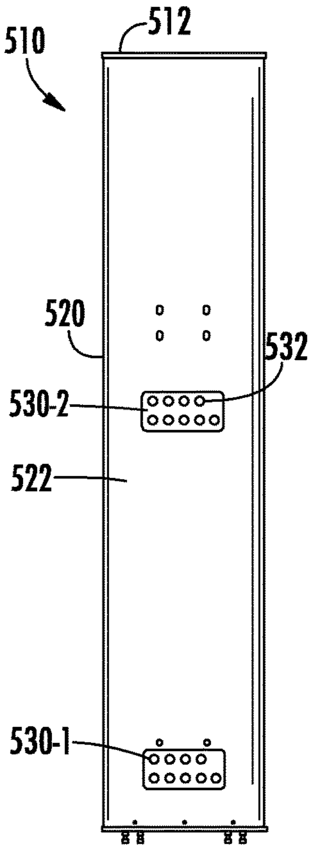
FIG. 28D is a back view of the base station antenna of FIG. 28A.

Turning first to FIGS. 28A-28D, a base station antenna 510 is depicted that is designed so that a pair of cellular radios may be mounted on the back side of the housing thereof. In particular, FIGS. 28A and 28B are a front perspective view and a rear perspective view, respectively, of the base station antenna 510, while FIGS. 28C and 28D are a front view and a rear view, respectively, of the base station antenna 510.

As shown in FIG. 28A-28D, the base station antenna 510 includes a top end cap 512, a bottom end cap 514 and a radome 520. A back surface 522 of the radome 520 includes a pair of openings. A connector plate 530 is mounted in each opening, and a plurality of RF connector ports 532 that form an array 534 of connector ports 532 are mounted in each connector plate 530. In the depicted embodiment, each connector plate 530 has a total of nine connector ports 532 mounted therein. Each connector port 532 may comprise an RF connector port that may be connected to an RF port on a radio by a suitable connectorized cable such as, for example, a coaxial jumper cable. In one example embodiment, each RF connector port 532 may comprise a double-sided connector port so that respective coaxial jumper cables may be connected to each side of each RF connector port 532. Accordingly, first coaxial jumper cables (not shown) that are external to the antenna 510 may extend between each RF connector port 532 and a respective RF connector port on a radio (not shown) that is mounted on the back of the antenna 510, and second coaxial jumper cables (not shown) that are internal to the antenna 510 may extend between each RF connector port 532 and one or more internal components of the antenna 510.

Figure 29A:
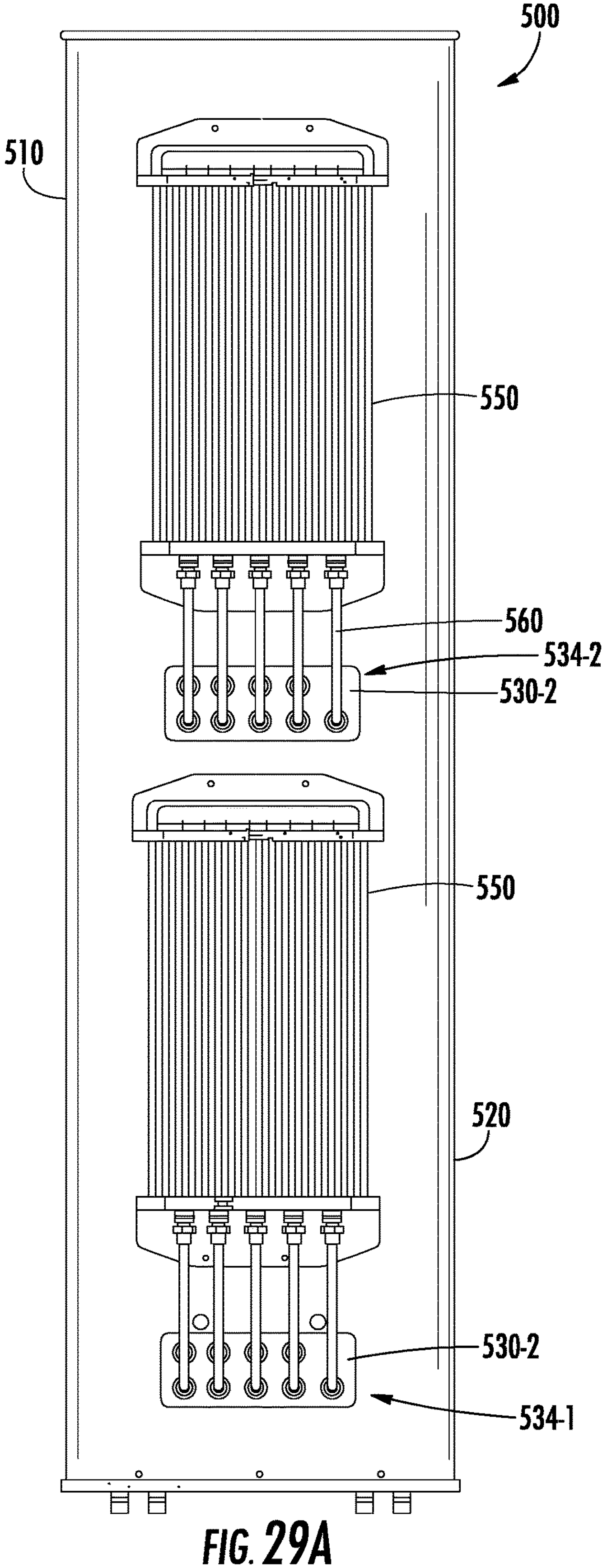
FIG. 29A is a back view of the base station antenna of FIGS. 28A-D with a pair of active antennas mounted thereon to provide an antenna assembly.
Figure 29B:
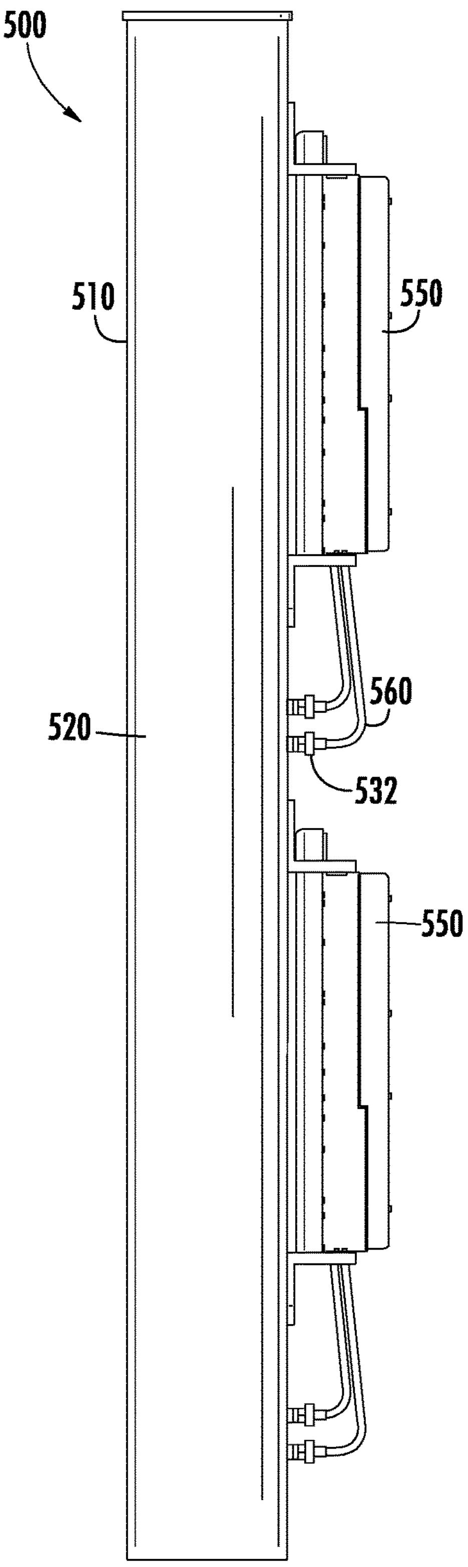
FIG. 29B is a side view of the antenna assembly of FIG. 29A.
Figure 29C:
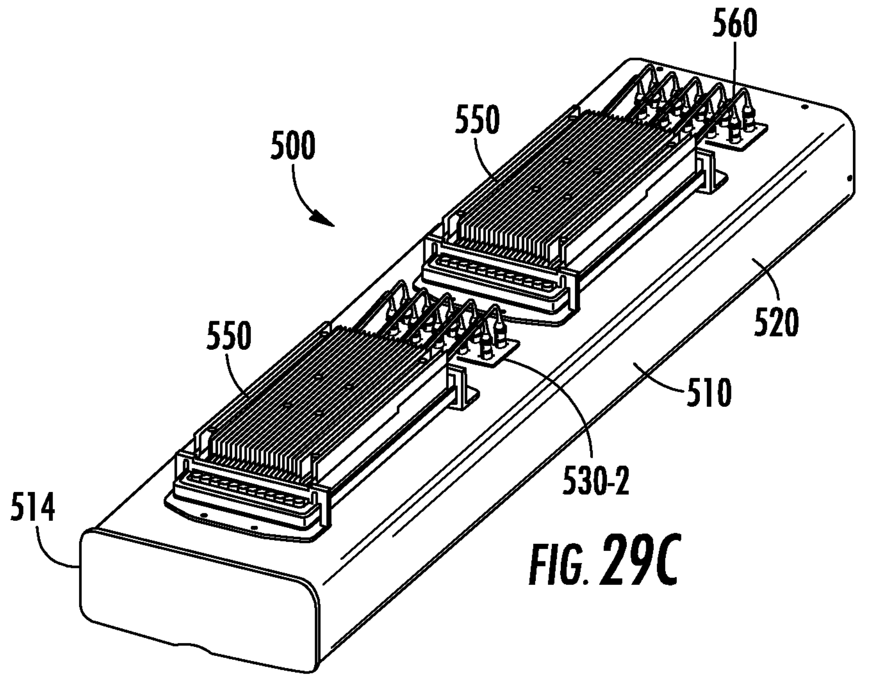
FIG. 29C is a back perspective view of the antenna assembly of FIG. 29A.
Figure 29D:
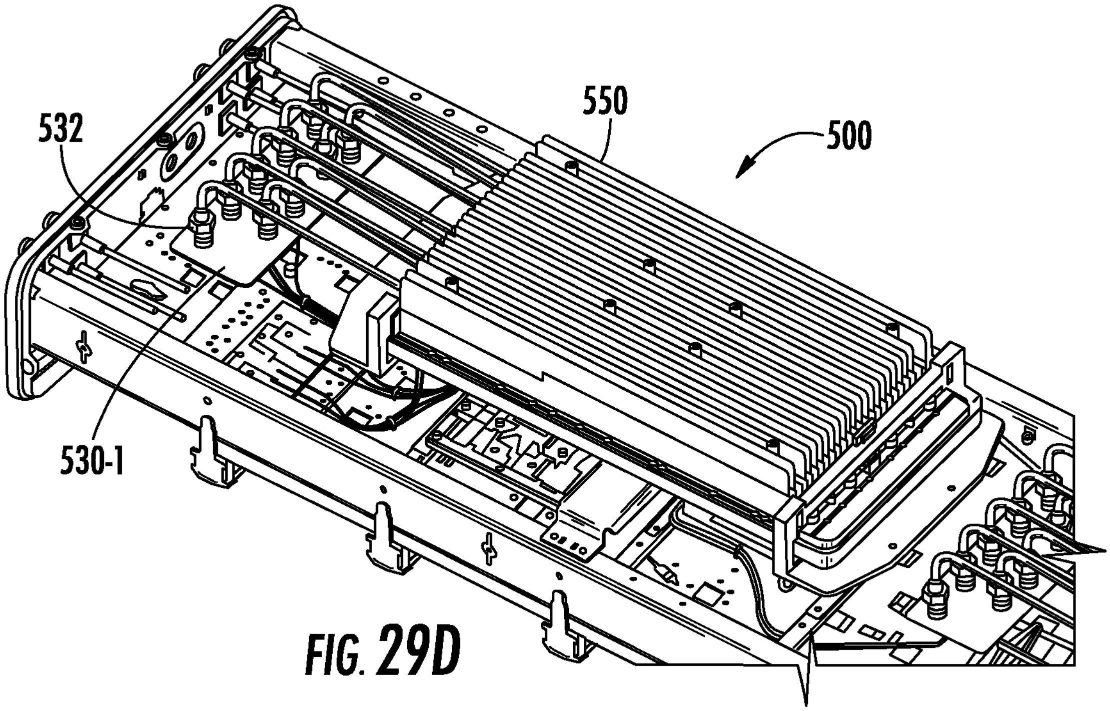
FIG. 29D is a partial back perspective view of the antenna assembly of FIG. 29A with the radome removed.

FIGS. 29A-29D are various views that illustrate the base station antenna 510 of FIGS. 28A-28D after two beamforming radios 550 have been mounted on the back side of the antenna to provide an antenna assembly 500. In particular, FIG. 29A is a back view of the antenna assembly 500, FIG. 29B is a side view of the antenna assembly 500, FIG. 29C is a back perspective view of the antenna assembly 500, and FIG. 29D is a partial back perspective view of the antenna assembly 500 with the radome 520 removed.

Referring to FIGS. 29A-29D, it can be seen that the antenna assembly 500 includes the base station antenna 510 of FIGS. 28A-28D and a pair of cellular radios 550 that are mounted on the back surface of the radome 520. Nine coaxial jumper cables 560 extend between nine connector ports 552 that are provided on each radio 550 and the nine connector ports 532 provided on a corresponding one of the connector plates 530.

The antenna assembly 500 of FIGS. 29A-29D may have a number of advantages over conventional antennas. As cellular operators upgrade their networks to support fifth generation ("5G") service, the base station antennas that are being deployed are becoming increasingly complex. For example, due to space constraints and/or allowable antenna counts on antenna towers of existing base stations, it may not be possible to simply add new antennas to support 5G service. Accordingly, cellular operators are opting to deploy antennas that support multiple generations of cellular service by including linear arrays of radiating elements that operate in a variety of different frequency bands in a single antenna. Thus, for example, it is common now for cellular operators to request a single base station antenna that supports service in three, four or even five or more different frequency bands. Moreover, in order to support 5G service, these antennas may include multi-column arrays of radiating elements that support active beamforming. Cellular operators are seeking to support all of these services in base station antennas that are comparable in size to conventional base station antennas that supported far fewer frequency bands. This raises a number of challenges.

One challenge in implementing the above-described base station antennas is that the number of RF connector ports included on the antenna is significantly increased. Whereas antennas having six, eight or twelve connector ports were common in the past, the new antennas may require far more RF connections. For example, the base station antenna 200 that is described above includes two linear arrays 220 of low-band radiating elements 222, two linear arrays 230 of first mid-band radiating elements 232, a four column planar array 240 of second mid-band radiating elements 242 and a four column planar array 250 of high-band radiating elements 252. All of the radiating elements 222, 232, 242, 252 may comprise dual-polarized radiating elements. Consequently, each column of radiating elements will be fed by two separate connector ports on a radio, and thus a total of twenty-four RF connector ports are required on the base station antenna 200 to pass RF signals between the twelve separate columns of radiating elements and their associated RF connector ports on the cellular radios. Moreover, each of the four column planar arrays of radiating elements 230, 240 are operated as a beamforming array, and hence a calibration connector port is required for each such array, raising the total number of RF connector ports required on the antenna to twenty-six. Additional control ports are also typically required which are used, for example to control electronic tilt circuits included in the antenna.

Conventionally, the above-described RF connector ports, as well as any control ports, have been mounted in the lower end cap of a base station antenna. Mounting the RF connector ports in this location can help locate the RF connector ports close to remote radio heads that are mounted separate from the antenna, which may improve the aesthetic appearance of the installed equipment and reduce RF cable losses. Additionally, mounting the RF connector ports to extend downwardly from the bottom end plate helps protect the base station antenna from water ingress through the RF connector ports and may shield the RF connector ports from rain.

Unfortunately, as the number of RF connector ports required in some base station antennas is increased, while the overall size of the antennas are kept relatively constant, the spacing between the RF connector ports on the bottom end cap may be reduced significantly. This can be seen, for example, in FIG. 31, which is a perspective view of a base station antenna having a large number of RF connector ports 532. When the RF connector ports 532 are close together as is the case in the antenna illustrated in FIG. 31, it may be difficult for technicians to install (and properly tighten) coaxial jumper cables onto the RF connector ports 532. If a jumper cable is not properly installed onto its corresponding RF connector port 532, various problems including passive intermodulation distortion or even loss of the RF connection may occur, requiring expensive and time-consuming tower climbs to correct the situation. In addition, as the density of RF connector ports 532 is increased, so is the possibility that a technician will connect one or more of the jumper cables to the wrong RF connector ports 532, again requiring tower climbs to correct. This problem may be exacerbated by the fact that the denser the array of RF connector ports 532 the less room there is on the bottom end cap for labels that assist the technician in the installation process.

As discussed above, in the antenna assembly 500 according to embodiments of the present invention, two arrays 534 of RF connector ports 532 are provided on the back surface of the base station antenna 510. One of the arrays 534 of connector ports 532 may comprise the RF connector ports 532 for the four column planar array 240 of second mid-band radiating elements 242 and the other array 534 of RF connector ports 532 may comprise the RF connector ports 532 for the four column planar array 250 of high-band radiating elements 252. As shown in FIGS. 29A-29D, this allows the RF connector ports 552 on each of the beamforming radios 550 to be connected to their corresponding RF connector ports 532 on the base station antenna 510 by very short coaxial jumper cables 560. This may result in as much as a 2-3 dB improvement in RF cable losses, which may provide a significant increase in throughput. Additionally, by mounting the beamforming radios 550 directly onto the base station antenna 510, the cellular operator may avoid leasing tower costs for the two radios 550, as leasing costs are typically based on the number of elements that are separately mounted on an antenna tower. Additionally, by moving eighteen of the RF connector ports 532 to the back of the antenna 510, the number of RF connector ports 532 mounted on the bottom end cap 514 may be reduced significantly (e.g., to eight RF connector ports in the example set forth above). This may make it easier for technicians to properly install the jumper cables 560, and leaves plenty of room for easy to read labels that aid installation.

Moreover, in some embodiments, the base station antenna 510 may be designed so that radios 550 manufactured by a wide variety of different equipment manufacturers may be mounted thereon. For example, the frame of the base station antenna 510 (which is located inside the radome 520) may include rails or other vertically extending members along the back surface thereof that the radios 550 may be mounted on. This may allow a cellular operator to order a base station antenna 510 according to embodiments of the present invention from a first vendor, a first beamforming radio 550 from a second vendor and a second beamforming radio 550 from a third vendor and then combine the three together to form the antenna assembly 500. This provides significant flexibility to the cellular operator to select vendors and/or equipment that best suit the needs of the cellular operator.

The base station antenna 510 is configured so that the first array 534-1 of RF connector ports 532 is mounted near the bottom of the back surface of the radome 520, and the second array 534-2 of RF connector ports 532 is mounted near the middle of the back surface of the radome 520. The beamforming radios 550 are mounted above their corresponding arrays 534 of RF connector ports 532 in this design. It will be appreciated, however, that embodiments of the present invention are not limited to this configuration. For example, FIGS. 30A-30C are schematic back views illustrating alternative arrangements for the arrays 534 of RF connector ports 532 that may be employed in base station antennas according to further embodiments of the present invention.

Figure 30A:
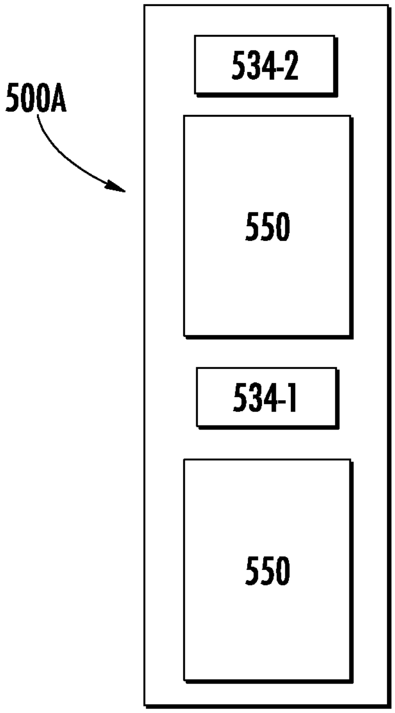
FIGS. 30A-30D are schematic back views illustrating alternative arrangements for the connector port arrays included in the base station antenna of FIGS. 28A-28D.
Figure 30B:
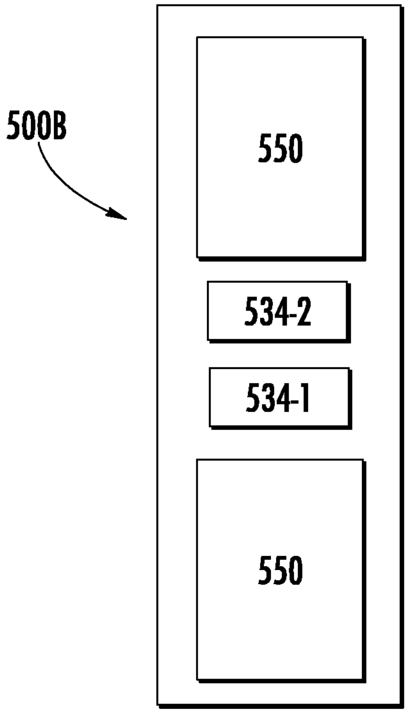
Figure 30C:
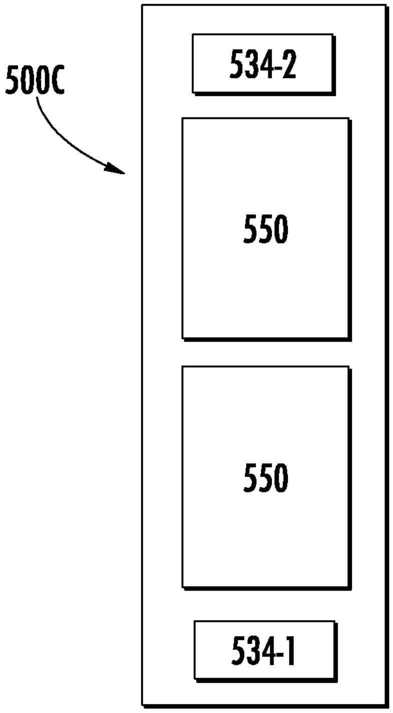
Figure 30D:
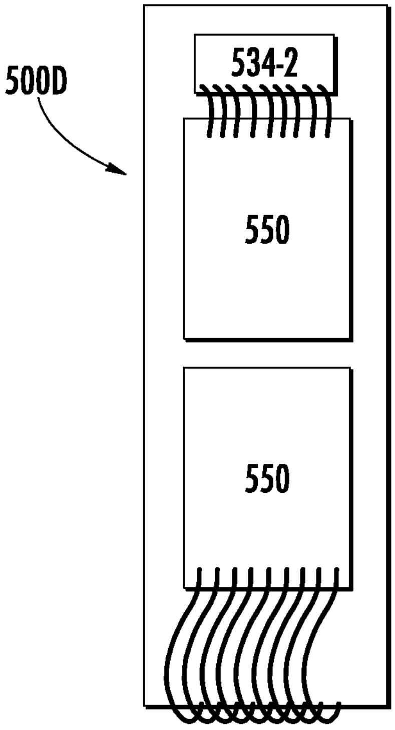
Figure 31:
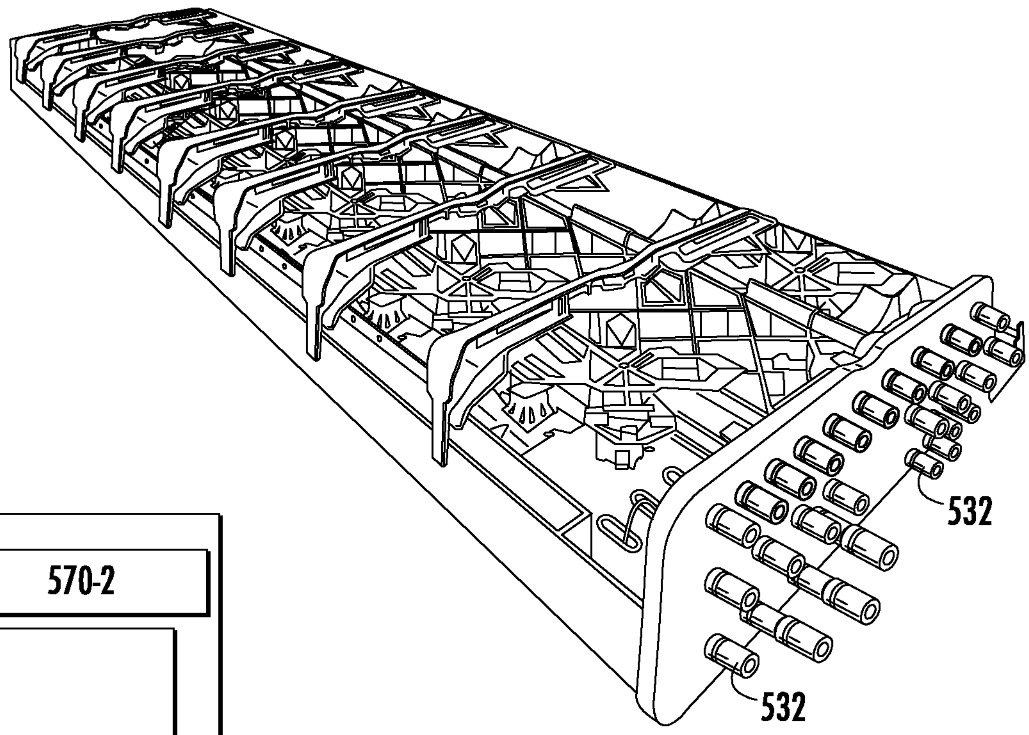
FIG. 31 is a front perspective view of a base station antenna having a large number of RF connector ports.

As shown in FIG. 30A, in a first alternative embodiment, an antenna assembly 500A is provided in which the first array 534-1 of RF connector ports 532 may be mounted near the top of the back surface of the antenna 510, and the second array 534-2 of RF connector ports 532 may be mounted near the middle of the back surface of the antenna 510. In this embodiment, the beamforming radios 550 may be mounted below their corresponding arrays 534 of RF connector ports 532. As shown in FIG. 30B, in a second alternative embodiment, an antenna assembly 500B is provided in which the first and second arrays 534-1, 534-2 of RF connector ports 532 may each be mounted near the middle of the back surface of the antenna 510, with one beamforming radio 550 mounted above the arrays 534 of RF connector ports 532 and the other beamforming radio 550 mounted below the arrays 534 of RF connector ports 532. As shown in FIG. 30C, in a third alternative embodiment, an antenna assembly 500C is provided in which the first array 534-1 of RF connector ports 532 may be mounted near the top of the back surface of the antenna 510, and the second array 534 of RF connector ports 532 may be mounted near the bottom of the back surface of the antenna 510, and the two beamforming radios 550 may be mounted in between the two arrays 534 of RF connector ports 532.

As discussed above, one of the potential advantages of the antenna assemblies 500 according to embodiments of the present invention is that they may allow for very short jumper cables 560 extending between the beamforming radios 550 and the base station antenna 510, which may significantly reduce RF cable losses. By deliberately selecting the location for the arrays 534 of RF connector ports 532, a similar reduction in RF cable losses may be obtained with respect to the internal jumper cables that connect the RF connector ports 532 to internal components of the base station antenna 510. For example, when the radios 550 are beamforming radios, the internal jumper cables will typically extend between the RF connector ports 532 and corresponding phase shifter or calibration circuits. Thus, if the arrays 534 of RF connector ports 532 are located to be near the corresponding phase shifter (or calibration board). short internal jumper cables may be used, further reducing RF cable losses.

While FIGS. 28A-30C illustrate embodiments in which the RF connector ports 532 for both beamforming radios 550 are mounted on connector plates on the rear surface of base station antenna assemblies 500 and 500A-500C, it will be appreciated that embodiments of the invention are not limited thereto. For example, any of these embodiments may be modified so that the RF connector ports 532 for the lower of the two beamforming radios 550 are mounted on the bottom end cap 514 of the base station antenna 510. One example of such a base station assembly 500D in which the RF connector ports 532 for the lower of the two beamforming radios 550 are mounted on the bottom end cap 514 of the base station antenna 510 is illustrated in FIG. 30D. Base station antenna 500B of FIG. 30B could similarly be modified so that the array 534-1 of connector ports 532 was relocated to the bottom end cap 514.

Figure 32:
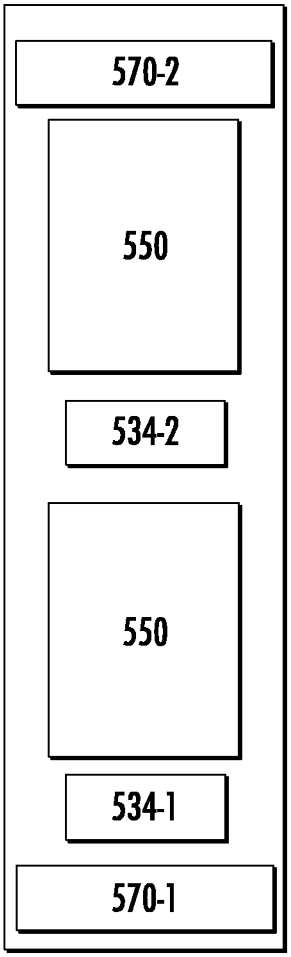
FIG. 32 is a schematic back view of an antenna assembly according to embodiments of the present invention illustrating how the mounting brackets that are used to connect the antenna assembly to a mounting structure may contact the antenna assembly at locations that are spaced apart from the radios to facilitate field replacement of the radios.

The antenna assemblies according to embodiments of the present invention, such as antenna assembly 500, may also be designed so that the radios 550 may be field-replaceable. Herein, a field-replaceable radio refers to a radio 550 that is mounted on a base station antenna that can be removed and replaced with another radio while the base station antenna is mounted for use on, for example, an antenna tower. In order to facilitate such field-replaceable capabilities, the antenna assembly 500 may be designed so that the mounting brackets 570 that attach between the antenna assembly 500 and the antenna tower (or other mounting structure) connect to the base station antenna 510 as opposed to connecting to the radios 550. Additionally, as shown in FIG. 32, the mounting brackets 570 may be spaced apart from the radios 550 so that a technician can access and remove the radios 550 while the antenna 510 is mounted on the antenna tower.

Figure 33A:
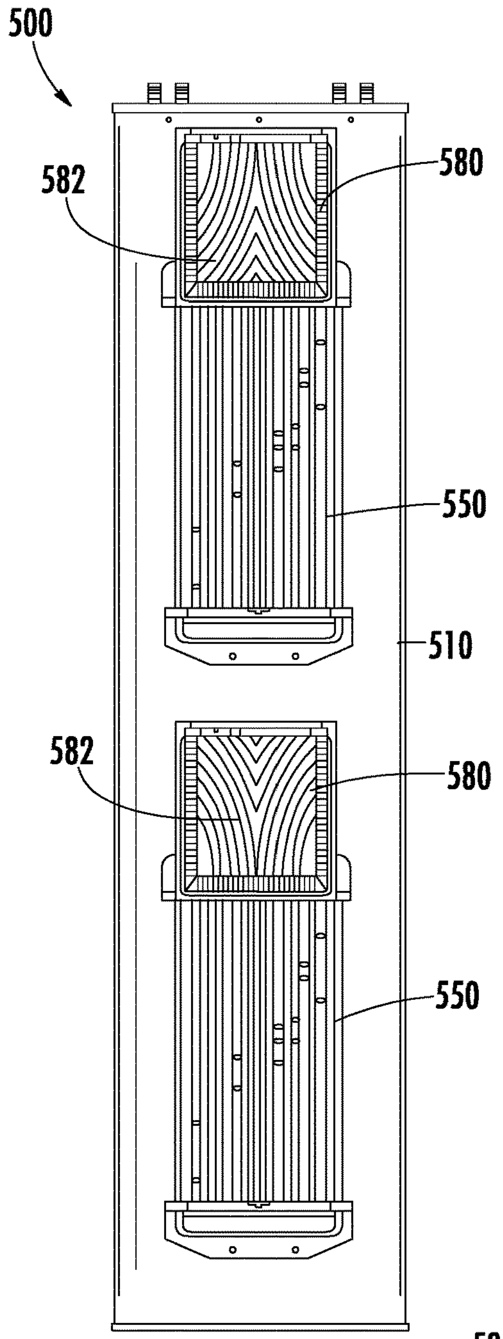
FIGS. 33A and 33B are a schematic back view and a schematic back perspective view, respectively, of an antenna assembly according to embodiments of the present invention that includes cosmetic covers that have air vents.
Figure 33B:
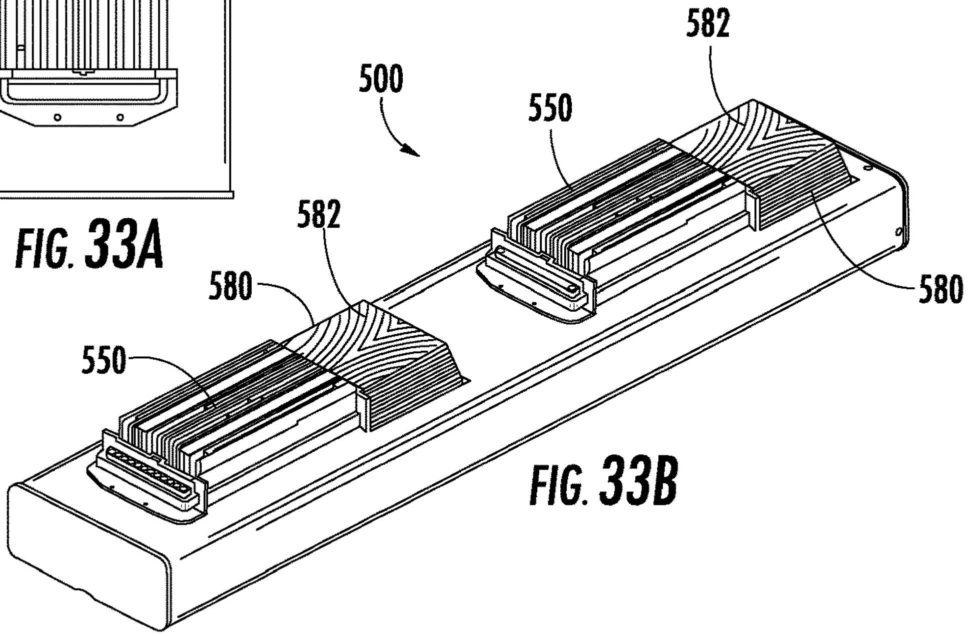
Figure 34:
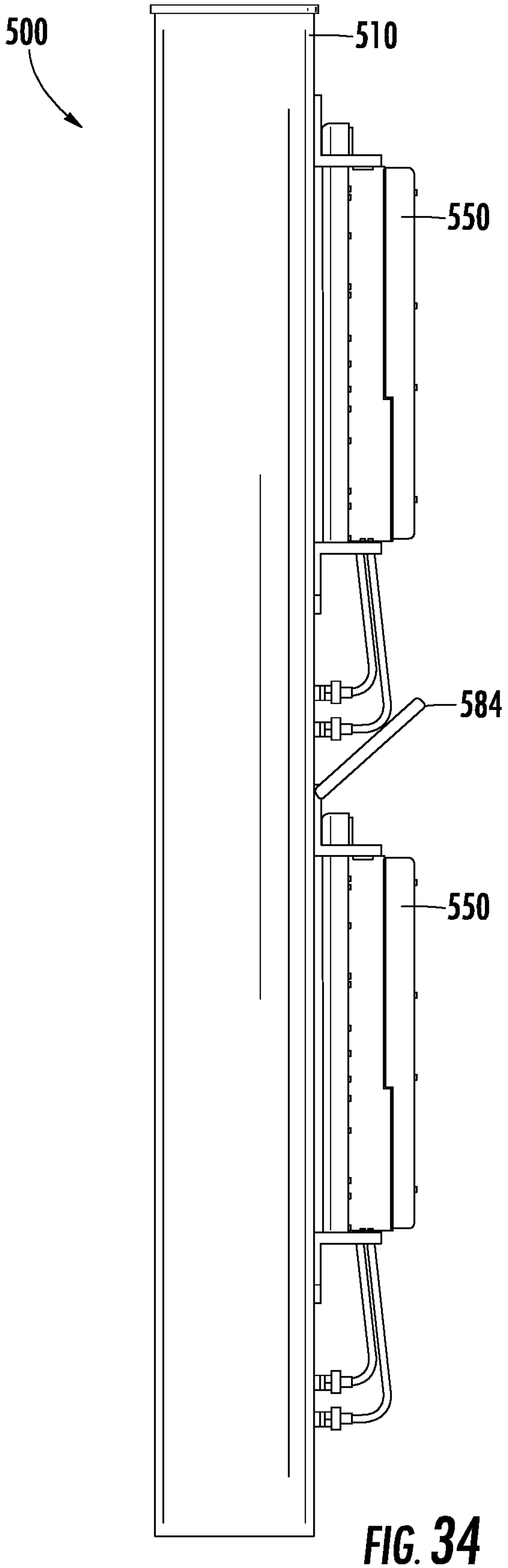
FIG. 34 is a schematic side view of an antenna assembly according to embodiments of the present invention that includes a baffle for redirecting heat vented from the lower radio away from the upper radio.

Referring next to FIGS. 33A and 33B, an embodiment of the antenna assembly 500 is shown that includes cosmetic covers 580 that cover and protect the RF connector ports 552 on the radios 550, the arrays 534 of connector ports 532 mounted on the back of the radome 520 and the jumper cables 560 extending therebetween. Moreover, in some embodiments, the cosmetic covers 580 may include a plurality of vents 582 that may facilitate transferring heat generated by the respective radios 550 away from the antenna assembly 500. As shown, the vents 582 on the lower cover 580 may be shaped to direct the vented hot air away from the upper radio 550. The cosmetic covers 580 may also provide environmental protection to the RF connector ports 532 and jumper cables 560. As shown in FIG. 34, in other embodiments, a baffle 584 may be provided between the lower radio 550 and the upper radio 550 that directs hot air vented from the lower radio 550 away from the upper radio.

The various embodiments of the antenna assembly 500 illustrated with respect to FIGS. 28A-34 use external jumper cables 560 to connect the RF connector ports 552 on the beamforming radios 550 to the RF connector ports 532 that are mounted on the back surface of the radome 520 or the bottom end cap 514. It will be appreciated, however, that in other embodiments blind-mate connectors may alternatively be used. FIGS. 35A-35C illustrate an antenna array 600 that includes such blind-mate connections. In particular, FIGS. 35A and 35B are a back view and an exploded perspective view, respectively, of the antenna assembly 600, while FIG. 35C is a pair of side views that illustrate how the radios 650 can be electrically connected to the base station antenna 610 via the blind mate connectors on the radios (not shown) and corresponding blind-mate connectors 632 that are mounted on the back of the base station antenna 610.

Figure 35:
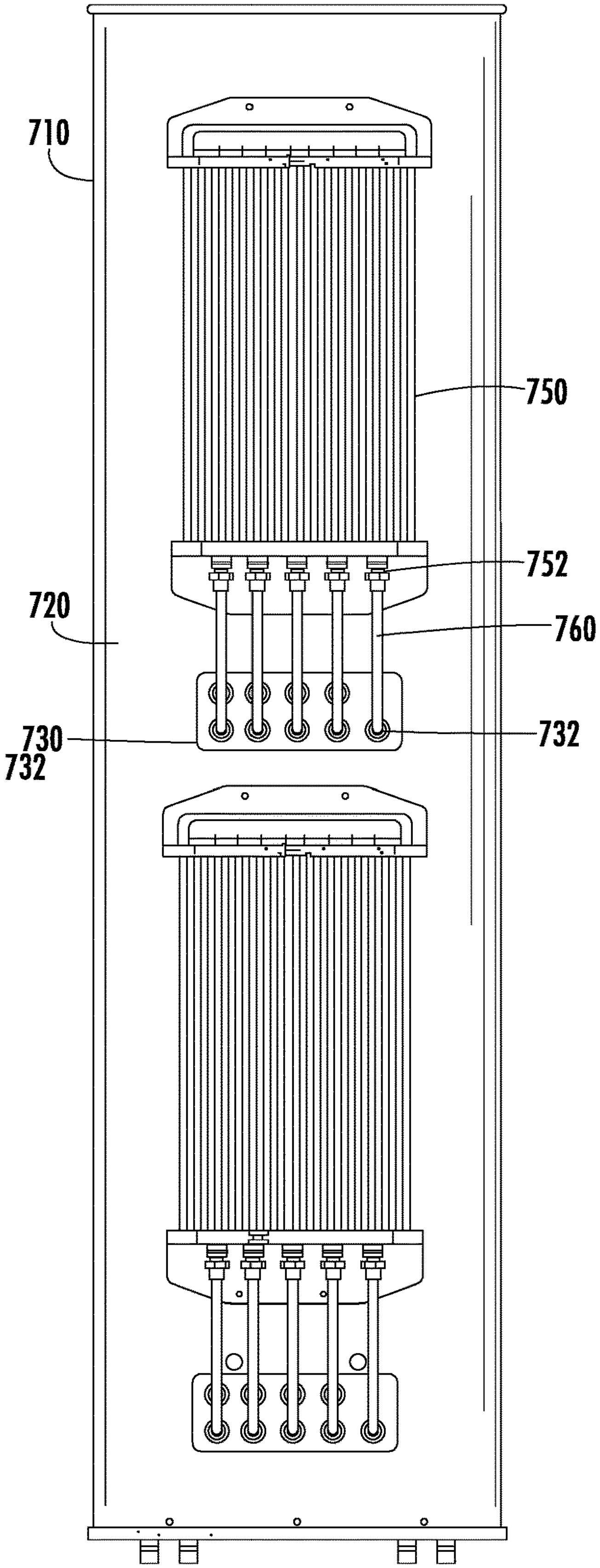
FIG. 35 is a back view of an antenna assembly according to further embodiments of the present invention that includes access holes in its back cover that allow coaxial jumper cables to extend directly from the radios to attach to internal components of the antenna.

Pursuant to further embodiments of the present invention, the RF connectors 532 included in the antenna assembly 500 may be replaced with access holes. FIG. 35 is a back view of an antenna assembly 700 that includes such a design. As shown in FIG. 35, the antenna assembly 700 includes a base station antenna 710 that has a pair of beamforming radios 750 mounted on a rear surface thereof. The radome 720 of antenna 710 includes a pair of panels 730 that have access openings 732 therein. Jumper cables 760 may extend from each RF connector port 752 on each radio 750 through a corresponding access hole 732 to connect to an internal component within the base station antenna 710.

It will be appreciated that many modifications may be made to the antenna assemblies described above without departing from the scope of the present invention. For example, while the above embodiments illustrate two radios mounted on the back of the antenna, it will be appreciated that in other embodiments different numbers of radios may be mounted on the antenna. For example, one, three, four or more radios may be mounted on the back of the antenna in other embodiments depending, for example, on cellular operator requirements. It will also be appreciated that while the beamforming antennas are shown mounted on the back of the antennas described above, embodiments of the present invention are not limited thereto. For example, in other embodiments, the radios that connect to the passive linear arrays may be mounted on the back of the antenna. However, in many instances it may be advantageous to mount the beamforming radios on the back of the antenna (which typically operate as time division duplexed radios) because these radios may be smaller and/or lighter weight than the radios that feed the passive, frequency division duplexed linear arrays 220, 230, and as the beamforming radios typically have more RF connector ports, and hence mounting the beamforming radios on the back of the antenna and moving the associated RF connector ports to the back of the antenna as well frees up more space on the bottom end cap, simplifying the installation process.

As another example, antenna assemblies according to embodiments of the present invention are discussed above that use jumper cable connections or blind mate connectors to electrically connect the beamforming radios to the base station antenna. As will be discussed in further detail below, it will be appreciated that in still further embodiments press-fit connectors may be used. Such press-fit connectors operate in a similar manner to the above-described blind-mate connectors, but the press-fit connectors may be visible to the technician during installation, making it easier to install the radios, particularly when the installation is performed at the top of an antenna tower.

Pursuant to still further embodiments of the present invention, filters may be added between at least some of the RF connector ports on the radios mounted on the antenna assemblies according to embodiments of the present invention and the RF connector ports on the antenna. In some countries, the frequency bands associated with certain cellular radios may be partially reserved for other uses. In such countries, only a portion of the frequency band may thus be used. One way to accommodate such requirements is to deploy radios that are designed to operate in only a portion of the frequency band. However, by adding external filters between the radio and the antenna, the need to replace the radio may be eliminated. Moreover, in some cases, the filters may be implemented as inline devices that may connect, for example, to the jumper cables or that may even be integrated into the jumper cables in some embodiments.

Pursuant to still further embodiments of the present invention, methods of installing beamforming radios on base station antennas to provide base station assemblies are provided. Methods of installation are provided that are suitable for factory installation as well as methods for field installing (or replacing) beamforming radios on base station antennas. In the discussion that follows the installation methods will primarily be described with reference to installing the beamforming radios 550 of FIGS. 28A-29D on base station antenna 510. It will be appreciated, however, that these techniques may be used for any of the other embodiments disclosed herein, with suitable modifications made as appropriate.

Figure 36A:
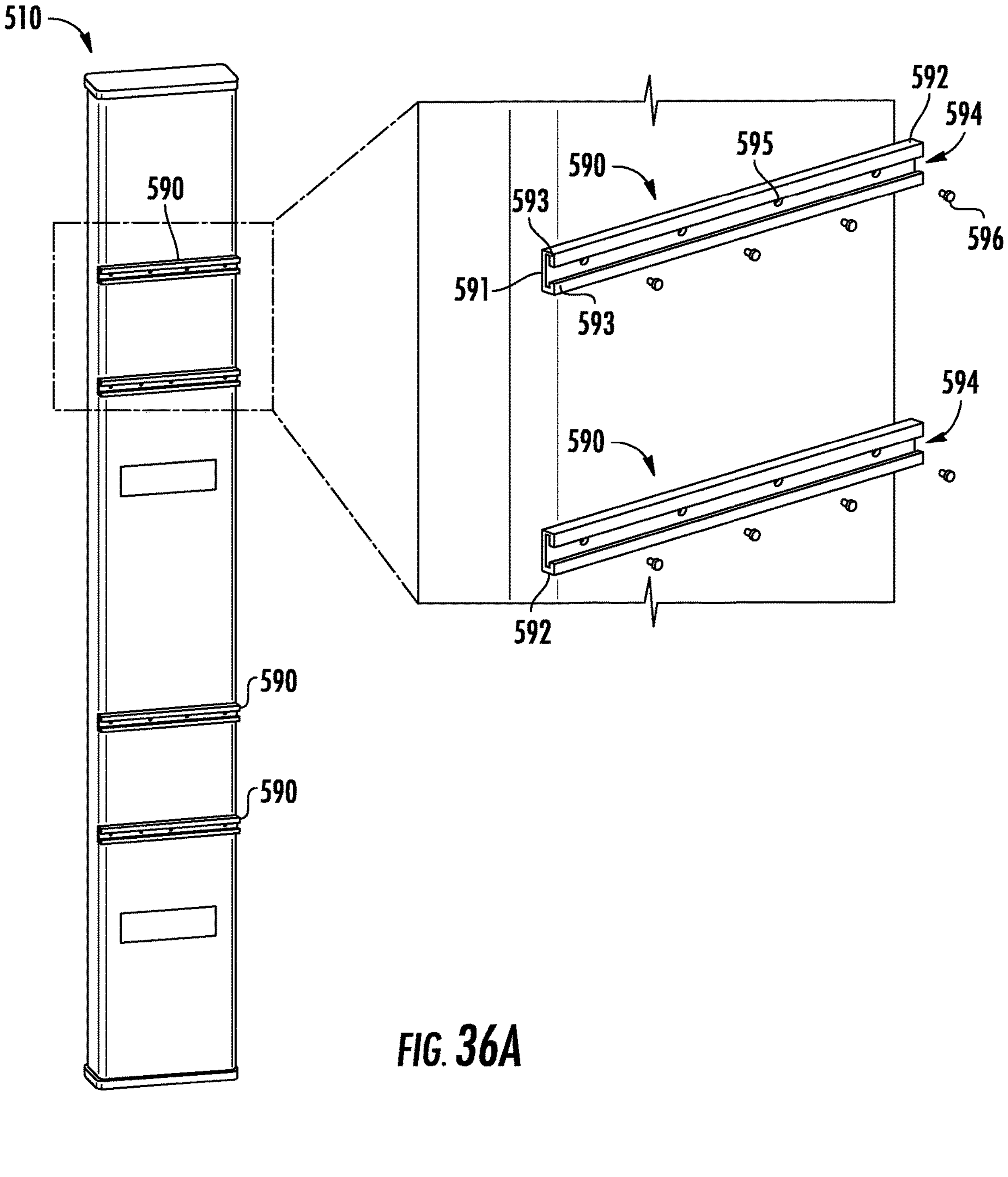
FIG. 36A is a rear perspective view of a base station antenna illustrating how guide rails may be mounted thereon that are used to mount beamforming radios on the back of the antenna.

Referring to FIG. 36A, in some embodiments, one or more guide rails 590 may be mounted on the rear surface of the base station antenna 510. For example, the frame of the base station antenna 510 may have support brackets (not shown) that extend between rearwardly-extending sidewalls of the frame, and each guide rail 590 may be mounted through the radome 520 onto one of the support brackets using screws or other attachment mechanisms. In the embodiment shown in FIG. 36A, a pair of horizontally-oriented guide rails 590 are provided for each beamforming radio 550.

As shown in FIG. 36A, each guide rail 590 may be implemented using a channel iron that has a front plate 591, rearwardly extending top and bottom walls 592, and lips 593 that extend downwardly and upwardly from the respective top and bottom walls 592 so that the guide rail 590 has a generally C-shaped transverse cross-section that defines an interior slot 594. Mounting holes 595 may be provided through the front wall 591 that receive screws or other fasteners 596 that are used to mount each guide rail 590 on the support plate or other structural component (not shown) of base station antenna 510. The guide rails 590 may be formed of aluminum or steel in example embodiments.

Figure 36B:
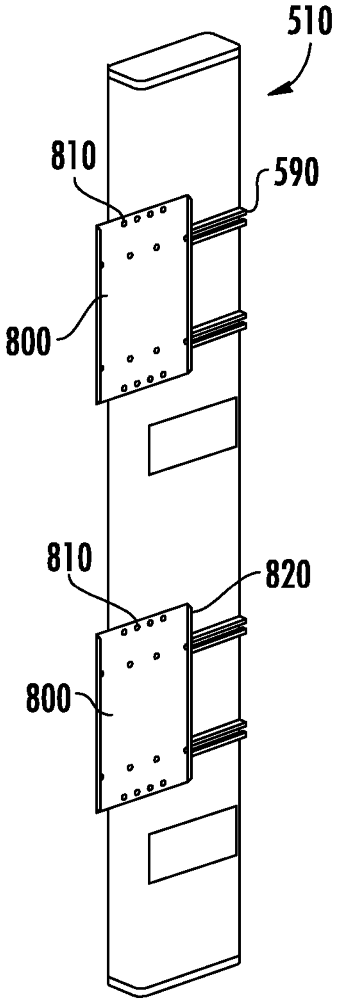
FIG. 36B is a rear perspective view of a base station antenna of FIG. 36A illustrating how radio support plates may be mounted on the antenna using the guide rails.

As shown in FIG. 36B, radio support plates 800 may be provided that are configured for mounting on the guide rails 590. Each radio support plate 800 may comprise, for example, a substantially planar metal plate that has mounting holes 810 therein. The radio support plates 800 need not be planar, however, and may include, for example, rearwardly-extending lips 820 or other non-planar features (e.g., the plate radio support 800 may be a corrugated plate). The size of each radio support plate 800 and the location of the mounting holes 810 may be customized based on the design of the beamforming radio 550 that is to be mounted on the base station antenna 510. Thus, different radio support plates 800 may be provided for different beamforming radio manufacturers and/or for different beamforming radio 550 models. For example, the beamforming radios 550 shown in FIG. 36D (discussed below) include top and bottom mounting flanges 551 (only the bottom mounting flanges 551 are visible in the figure) that have openings therein 553 therein. The opening 553 may be aligned with the mounting holes 810 on the radio support plates 800 so that each beamforming radio 550 may be mounted on a respective radio support plate 800 using screws, bolts or other fasteners.

Figure 36C:
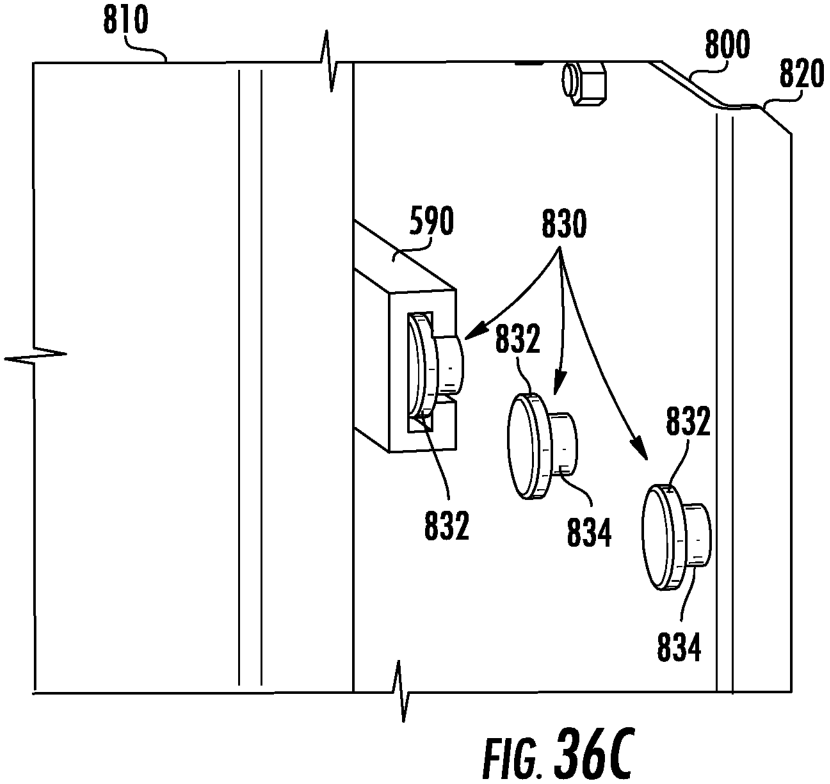
FIG. 36C is an enlarged view illustrating how guide structures on the radio support plate are received within one of the guide rails mounted on the antenna.

Referring to FIG. 36C, one or more guide structures 830 may be mounted on the front surface of the radio support plate 800 using, for example, screws or bolts. In the depicted embodiment, each guide structure 830 comprises a rotatable wheel 832 that is mounted on a mounting post 834. The wheels 832 are sized to be received in the slot 594 that is defined between the front plate 591, top and bottom walls 592 and lips 593 of one of the guide rails 590. The lips 593 may be spaced apart a distance that exceeds the height of the mounting posts 834 but that is less than a height of the wheels 832. Accordingly, a radio support plate 800 having guide structures 830 in the form of wheels 832 mounted on posts 834 may be mounted on one or more guide rails 590 by sliding the radio support plate 800 laterally parallel to the guide rail(s) 590 so that the wheels 832 are received within the slots 594 in the guide rail(s) 590. While not shown in the figures, a stop such as a tab or a bolt may be provided at one end of the slot 594 that prevent further lateral movement of the radio support plate 800 (and the radio 550 mounted thereon) relative to the base station antenna 510 once the guide structures 830 on the radio support plate 800 have been fully inserted into the respective slots 594 of the guide rails 590. The stop may comprise, for example, a screw or bolt that is inserted through the radome 520 of base station antenna 510 into the support bracket, where the head of the screw/bolt is either within the slot 594 or just outside the slot 594 so that the first wheel 832 inserted into the guide rail 590 will eventually abut the head of the screw/bolt to prevent further lateral movement of the radio support plate 800. A second stop may also be installed at the other end of one or more of the guide rails 590 that, after installation, prevents lateral movement of the radio support plate 800 in either direction. The second stop may be any appropriate structure including a screw, a bolt, a snap-in stop, a latch, etc.

Figure 36D:
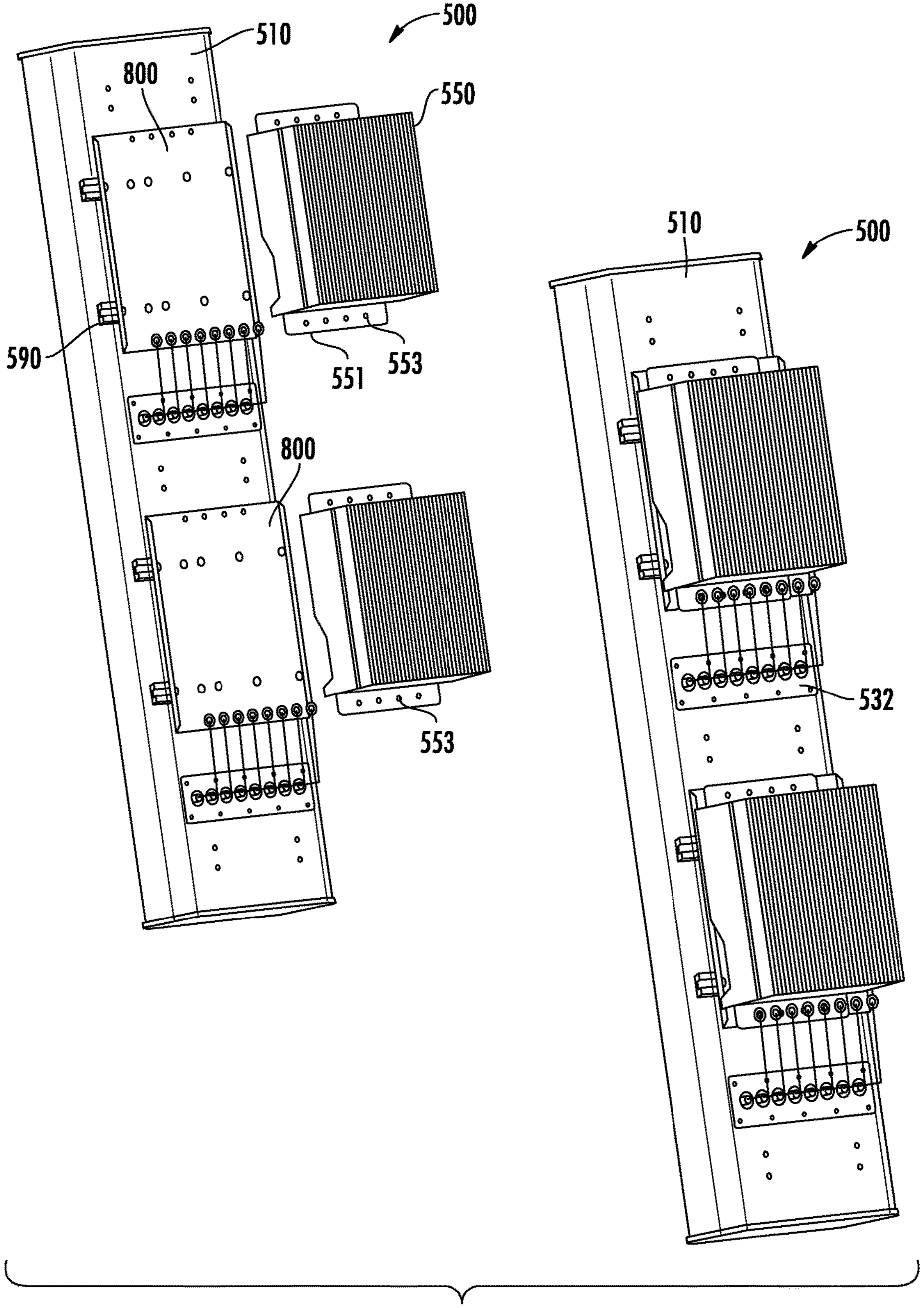
FIG. 36D shows exploded and assembled rear perspective views illustrating how beamforming radios may be mounted on the radio support plates after the radio support plates are mounted on the base station antenna.
Figure 36E:
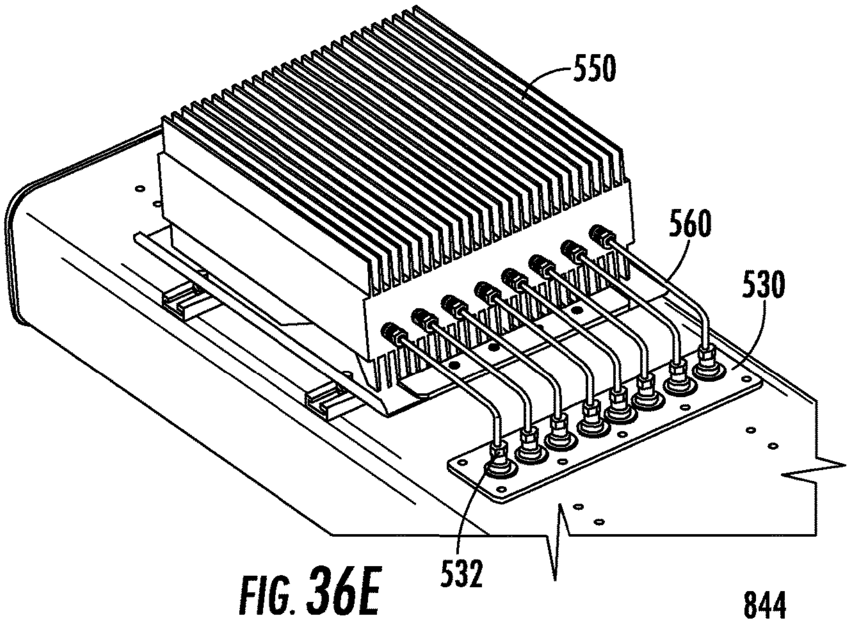
FIG. 36E is an enlarged partial view illustrating the jumper cables that connect the beamforming radio to the base station antenna.

Referring to FIG. 36D, once the radio support plates 800 with the beamforming radios 550 mounted thereon are installed on the rear surface of the base station antenna 510, the beamforming radios 550 may be mounted on the respective radio support plates 800 using, for example, screws or other fasteners. Referring to FIG. 36E, jumper cables 560 may then be installed that electrically connect the connector ports 552 on each beamforming radio 550 to respective RF connector ports 532 on the base station antenna 510.

Figure 37A:
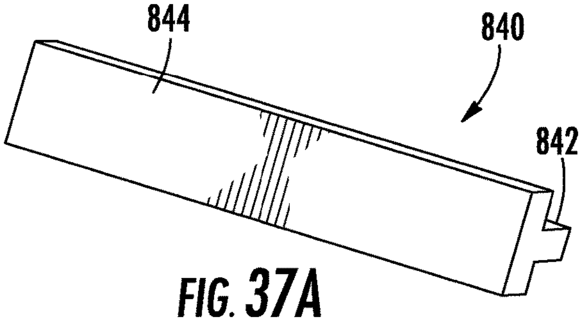
FIG. 37A is a schematic perspective view of an alternate guide structure in the form of a rail.
Figure 37B:
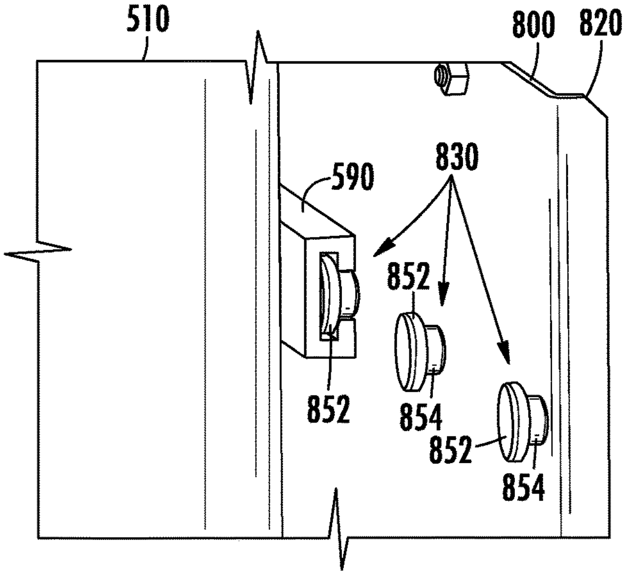
FIG. 37B is a schematic perspective view of a radio support plate that has a guide structure in the form of a plurality of post-mounted knobs mounted thereon.

Implementing the guide structures 830 as rotatable wheels 832 that are mounted on posts 834 may provide for a very low friction interface that may make it easier for an installer to mount the radio support plate 800 (with or without a beamforming radio 550 mounted thereon) on the base station antenna 510. However, it will be appreciated that a wide variety of other guide structures 830 could be used. For example, FIG. 37A illustrates another embodiment in which the guide structure 830 comprises a rod 840 having a generally T-shaped cross-section that has a base 842 and a distal end 844. The distal end 844 may be received within the slot 594 of a guide rail 590. The rod 840 can be coated with a low friction material to make it easier for the rod 840 to be slid into the slot 594 in a guide rail 590. FIG. 37B illustrates still another embodiment in which the guide structure 830 is implemented by replacing the post-mounted wheels 832/834 of FIG. 36C with static knobs 852 that are mounted on posts 854. Many other implementations are possible. It will also be appreciated that in still further embodiments the guide structures 830 may be mounted on the rear surface of the base station antenna 510 and the guide rails 590 may be mounted on the radio support plate 800.

The beamforming radios 550 may also be readily replaced in the field. As is well known, base station antennas are typically mounted on towers, often hundreds of feet above the ground. Base station antennas may also be large, heavy and mounted on antenna mounts that extend outwardly from the tower. As such, replacing base station antennas may be difficult and expensive. The beamforming radios 550 of base station antenna assembly 500 may be field replaceable without the need to detach the base station antenna 510 from an antenna mount. Instead, the jumper cables 560 that extend between the base station antenna 510 and the beamforming radios 550 may be removed, and any stop mechanisms such as stop bolts or latches that are used to hold each radio support plate 800 with a beamforming radio 550 mounted thereon in place (to prevent lateral movement of the radio support plate 800 relative to the radio 550) on the base station antenna 510 may also be removed or unlatched. Each radio support plate 800 with a beamforming radio 550 mounted thereon may then be removed simply by sliding the radio support plate 800 laterally until the guide structure(s) 830 are free of the slots 594 in the respective guide rails 590. Then, a different beamforming radio 550 that is mounted on an appropriate radio support plate 800 may be positioned adjacent the guide rails 590 so that the guide structures 830 on the radio support plate 800 are aligned with the guide rails 590. The installer may then move the new radio support plate 800 laterally so that the guide structures 830 are captured by the respective guide rails 590 on the base station antenna 510. Once the new radio support plate 800 (with new beamforming radio 550 mounted thereon) is fully installed on the guide rails 590, the above-discussed stop/latching mechanism(s) may be engaged to prevent lateral movement of the new radio support plate 800 relative to the base station antenna 510. It should be noted that in some embodiments the new beamforming radio 550 may be installed without the use of any tools or with only a screwdriver.

As discussed above, conventional jumper cables 560 may be used to connect each connector port 552 on a beamforming radio 550 to a respective RF connector port 532 on the base station antenna 510. The RF connector ports 532 may be mounted, for example, on a plate 530 on the rear surface of the antenna 510 or on the bottom end cap 514 of the antenna 510, as discussed above. Any appropriate RF connectors may be used for the RF connector ports 532 such as, for example, 4.3/10 connectors. In other embodiments, blind mate connectors may be used on either the beamforming radio 550 or on the antenna to simplify electrically connecting the beamforming radios 550 to the base station antenna 510.

Figure 38A:
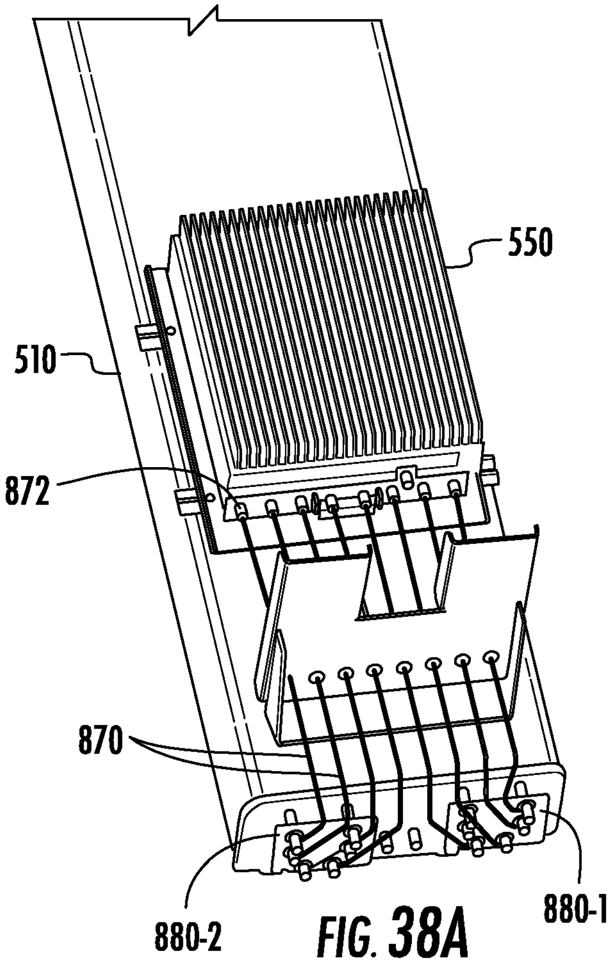
FIG. 38A is a perspective view illustrating how a jumper cable assembly that includes a connector plate on one end of each jumper cable and cluster connectors on the other end of each jumper cable may be used to connect a beamforming radio to a base station antenna.
Figure 38B:
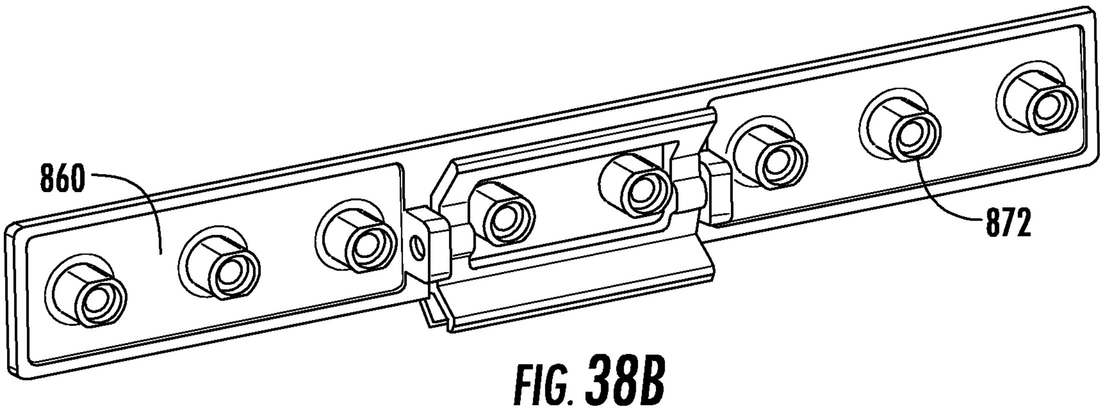
FIG. 38B is a schematic perspective view of the connector plate of FIG. 38A with blind mate connectors mounted therein.

For example, referring to FIG. 38A, in some embodiments, a plurality of connectorized jumper cables 870 may be provided where each jumper cable 870 has a blind mate connector 872 on a first end thereof. The blind mate connectors 872 may be push-in connectors. Each blind mate connector 872 may be mounted in a connector plate 860. Beamforming radios 550 are sold by a variety of different manufacturers, and the layout of the connector ports 552 on each beamforming radio 550 will differ by manufacturer and/or for different radio models. A connector plate 860 may be provided for each different beamforming radio 550 design, where each connector plate 860 has openings for blind mate connectors 872 that are aligned with the connector port 552 arrangement on the respective beamforming radio 550 designs. FIG. 38B is an enlarged perspective view of the connector plate 860 that shows the blind mate connectors 872 mounted therein. The cable portion of each jumper cable 870 is omitted in FIG. 38B to better show how the blind mate connectors 872 are mounted in connector plate 860. The connector plate 860 may be pushed into place so that the blind mate connectors 872 are inserted into the corresponding connector ports 552 on the beamforming radio 550 in order to connect all of the jumper cables 870 to the beamforming radio 550 in a single operation, simplifying the installation process. The use of the connector plate 860 may also reduce the possibility of connecting jumper cables 870 to the wrong connector ports 552 on the beamforming radio 550.

As is further shown in FIG. 38A, the second end of each jumper cable 870 may be connected to one or more cluster connectors 880. A cluster connector may comprise a plurality of connectors that are fixedly pre-mounted in a common plate. In the embodiment shown in FIG. 38A, two cluster connectors 880-1, 880-2 are provided, with five of the jumper cables 870 connected to the first cluster connector 880-1 and the remaining four jumper cables 870 connected to the second cluster connector 880-2. The RF ports 532 on base station antenna 510 may be arranged to mate with the two cluster connectors 880, and each cluster connector 880 may be pushed onto a corresponding group of four or five RF connector ports 532 in order to quickly and easily connect the jumper cables 870 to the base station antenna 510. Suitable cluster connectors are disclosed in U.S. patent application Ser. No. 16/375,530, filed Apr. 4, 2019, the entire content of which is incorporated herein by reference.

In other embodiments (not shown), the end of each jumper cable 870 that is not mounted in the connector plate 860 may have a conventional RF connector mounted thereon. In such embodiment, each jumper cable 870 may be individually connected by an installer to a respective RF connector port 532 on the base station antenna 510. In still other embodiments (also not shown), the second ends of the respective jumper cables 870 may be mounted in a second connector plate 860 and the second connector plate 860 may be pushed into place onto the RF connector ports 532 of the base station antenna 510 in order to connect all of the jumper cables 870 to the base station antenna 510 in a single operation.

It will also be appreciated that jumper cable assemblies that have cluster connectors on both ends of the cables may be used in other embodiments or alternatively be used to provide the RF connections between the beamforming radios 550 and the base station antenna 510.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna, comprising:

a first reflector;

a vertically-extending array of first radiating elements mounted to extend forwardly from the first reflector;

a removable sub-module that includes a second reflector that is separate from the first reflector; and a vertically-extending array of second radiating elements that is transversely spaced-apart from the vertically-extending array of first radiating elements, the second radiating elements mounted to extend forwardly from the second reflector, wherein the vertically-extending array of second radiating elements is provided as a multiple column array of the second radiating elements, wherein the second radiating elements reside behind the first radiating elements, in a front-to-back direction of the base station antenna, wherein the first radiating elements are dual polarized radiating elements, and wherein some of the first radiating elements extend laterally across and in front of some of the second radiating elements.

2. The base station antenna of claim 1, wherein the second reflector is capacitively coupled to the first reflector.

3. The base station antenna of claim 1 wherein the first reflector is parallel to the second reflector and the first reflector is longer than the second reflector, wherein the array of second radiating elements project forward from the second reflector a shorter distance than the array of first radiating elements project forward from the first reflector, and wherein the removable sub-module is a self-contained beam forming antenna.

4. The base station antenna of claim 1, wherein longitudinally-extending right and left side portions of the second reflector are spaced apart from adjacent longitudinally-extending segments of the first reflector by an insulator positioned therebetween.

5. The base station antenna of claim 1, wherein the second reflector is coplanar with the first reflector.

6. The base station antenna of claim 1 wherein the removable sub-module further includes a plurality of phase shifters and a calibration circuit.

7. The base station antenna of claim 1, further comprising first and second beamforming radios that are longitudinally spaced apart and individually removably attached to a rear surface of the base station antenna.

8. The base station antenna of claim 1, wherein the first reflector includes an opening, and wherein the removable sub-module is received within the opening.

9. The base station antenna of claim 1, further comprising a vertically-extending array of third radiating elements mounted to extend forwardly from the first reflector, wherein the vertically-extending array of second radiating elements is positioned between the vertically-extending array of first radiating elements and the vertically-extending array of third radiating elements.

10. The base station antenna of claim 1, wherein a periphery of the first reflector defines a footprint when viewed along an axis that is perpendicular to the first reflector, wherein the first reflector is parallel to and in a different plane from the second reflector, and wherein at least some of the second radiating elements are within the footprint.

11. The base station antenna of claim 1, wherein the first radiating elements and the second radiating elements are configured to serve a common sector of a base station that includes the base station antenna.

12. The base station antenna of claim 1, wherein a lip of the second reflector is capacitively coupled to the first reflector.

13. The base station antenna of claim 1, wherein the first array of radiating elements is a single vertically aligned linear column of low band or mid-band radiating elements.

14. The base station antenna of claim 1, wherein the first reflector is part of a first backplane that defines a main module of the base station antenna, and wherein the sub-module is configured to be slidably received within the main module.

15. The base station antenna of claim 1, further comprising a radio that is releasably attached to the base station antenna and at least one filter that is electrically connected between an RF port of the radio and an RF port of the base station antenna.

16. The base station antenna of claim 1, wherein the sub-module is a self-contained removable sub-module configured so that RF paths that extend between the vertically-extending array of second radiating elements and one or more RF ports that connect the vertically-extending array of second radiating elements to a radio are contained within the removable sub-module.

17. The base station antenna of claim 16, further comprising a radio, a radio support plate and a pair of rails, wherein the radio is mounted on the radio support plate and the radio support plate is mounted on the pair of rails.

18. The base station antenna of claim 1, wherein the removable sub-module further includes a plurality of electromechanical phase shifters that are interposed on transmission paths extending between RF ports and the second radiating elements, and wherein the first reflector is parallel to and in a different plane from the second reflector.

19. A base station antenna, comprising:

a vertically-extending array of first radiating elements;

a removable sub-module that includes a reflector; and a vertically-extending array of second radiating elements mounted to extend forwardly from the reflector of the removable sub-module, wherein at least one of the first radiating elements overlies the reflector of the removable sub-module when the base station antenna is viewed along an axis that is perpendicular to a main surface of the reflector of the removable sub-module, and wherein the vertically extending array of second radiating elements terminate, in a front-to-back direction of the base station antenna, a distance behind dipole arms of the vertically-extending array of first radiating elements.

20. The base station antenna of claim 19, wherein the vertically-extending array of second radiating elements is provided by a multi-column array with at least some of the columns transversely spaced-apart from the vertically-extending array of first radiating elements.

21. The base station antenna of claim 19, wherein the reflector of the sub-module defines a second reflector, wherein the base station antenna further comprises a first reflector, and wherein at least some of the first radiating elements are mounted to extend forwardly from the first reflector, and wherein the first reflector is parallel to and in a different plane from the second reflector.

22. The base station antenna of claim 21, wherein the first reflector is capacitively coupled to the second reflector.

23. The base station antenna of claim 21, wherein the first reflector comprises an opening and the second reflector is received in the opening.

24. A base station antenna, comprising:

a main module that includes a vertically-extending array of first radiating elements; and a self-contained and removeable sub-module that is received within the main module, the sub-module including a plurality of radio frequency ("RF") ports that are coupled to respective vertically-extending linear arrays of second radiating elements that form a beamforming array;

wherein the vertically-extending array of first radiating elements is laterally offset from the vertically-extending linear arrays of second radiating elements but positioned so that some of the first radiating elements overlap some of the second radiating elements when the base station antenna is viewed from the front.

25. The base station antenna of claim 24, wherein RF paths that extend between the vertically-extending array of second radiating elements and one or more RF ports that connect the vertically-extending array of second radiating elements to a radio are completely contained within the sub-module.

26. The base station antenna of claim 24, wherein the main module includes a first reflector and the sub-module includes a second reflector that is capacitively coupled to the first reflector, and wherein the first reflector is parallel to but in a different plane that the second reflector.

27. The base station antenna of claim 26, wherein the first reflector includes an opening, and wherein the removeable sub-module is received within the opening.

* * * * *